US010988210B2

(12) United States Patent
Moerbe

(10) Patent No.: US 10,988,210 B2
(45) Date of Patent: Apr. 27, 2021

(54) HYBRID CHINE BOAT HULL AND METHODS OF MANUFACTURE AND USE

(71) Applicant: MBLH MARINE, LLC, Port Arthur, TX (US)

(72) Inventor: Ron Moerbe, Port Arthur, TX (US)

(73) Assignee: MBLH MARINE, LLC, Port Arthur, TX (US)

( * ) Notice: Subject to any disclaimer, the term of this patent is extended or adjusted under 35 U.S.C. 154(b) by 0 days.

(21) Appl. No.: 16/560,268

(22) Filed: Sep. 4, 2019

(65) Prior Publication Data

US 2020/0231252 A1 Jul. 23, 2020

Related U.S. Application Data

(60) Provisional application No. 62/795,847, filed on Jan. 23, 2019.

(51) Int. Cl.
| | | |
|---|---|---|
| *B63B 3/14* | (2006.01) | |
| *B63B 1/06* | (2006.01) | |
| *B63B 1/08* | (2006.01) | |
| *B63B 1/04* | (2006.01) | |
| *B63B 1/20* | (2006.01) | |

(52) U.S. Cl.
CPC ............... *B63B 3/14* (2013.01); *B63B 1/06* (2013.01); *B63B 1/08* (2013.01); *B63B 1/042* (2013.01); *B63B 2001/201* (2013.01)

(58) Field of Classification Search
CPC ..... B63B 1/042; B63B 1/06; B63B 2001/066; B63B 1/08; B63B 1/20; B63B 2001/201; B63B 2001/202; B63B 1/04; B63B 3/14

USPC .............. 114/60, 61.26–63, 288–291
See application file for complete search history.

(56) References Cited

U.S. PATENT DOCUMENTS

| | | | | | |
|---|---|---|---|---|---|
| 2,878,772 | A | * | 3/1959 | Kjekstad | B63B 39/06 114/126 |
| 3,108,561 | A | * | 10/1963 | McNeil | B63B 1/20 114/290 |
| 3,149,351 | A | * | 9/1964 | Plum | B63B 1/20 114/355 |
| 3,237,581 | A | * | 3/1966 | Moesly | B63B 1/20 114/61.33 |
| 3,298,343 | A | * | 1/1967 | Juhnke | B63B 3/18 114/356 |
| 3,661,109 | A | * | 5/1972 | Weiland | B63B 1/20 114/291 |
| 3,938,457 | A | * | 2/1976 | Dwyer | B63B 1/04 114/61.31 |
| 3,981,035 | A | * | 9/1976 | Iwabuchi | B63B 7/00 114/354 |
| 4,022,143 | A | * | 5/1977 | Krenzler | B63B 1/18 114/271 |

FOREIGN PATENT DOCUMENTS

JP  57118978 A * 7/1982 ............... B63B 1/04

* cited by examiner

*Primary Examiner* — Ajay Vasudeva
(74) *Attorney, Agent, or Firm* — Norton Rose Fulbright US LLP

(57) ABSTRACT

This disclosure describes hybrid chine hulls, marine vessels including hybrid chine hulls and methods of manufacturing and using hybrid chine hulls. An exemplary hybrid chine hull includes a keel, a single chine section, and a double chine section distinct from the single chine section with respect to a longitudinal direction of the keel and positioned aft of the single chine section.

20 Claims, 15 Drawing Sheets

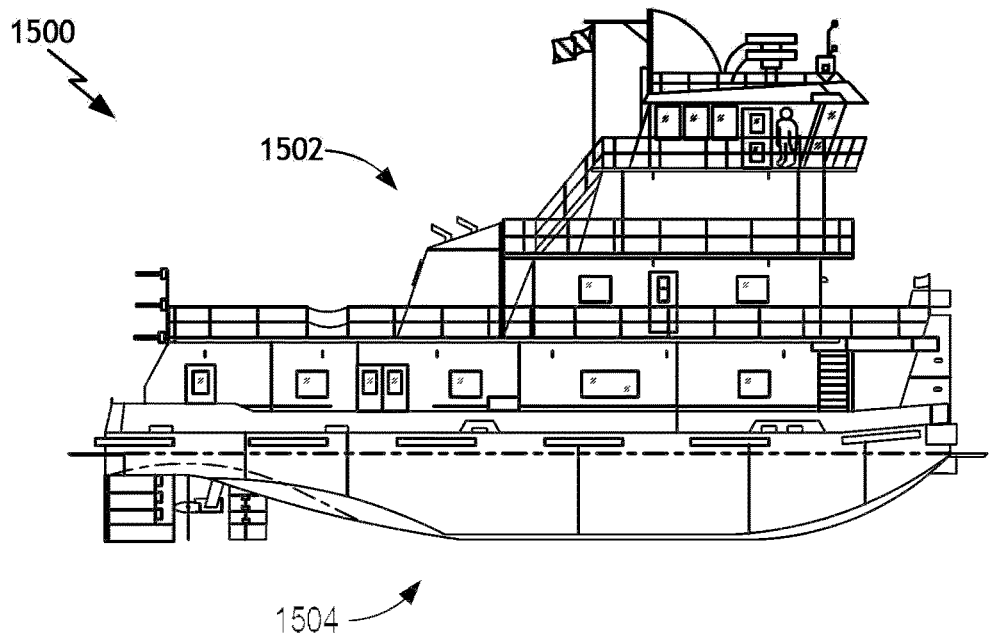

FIG. 15

Input Parameters

| | | |
|---|---|---|
| Length Overall | 87.9000 | ft |
| Beam Overall | 32.0001 | ft |
| Depth Overall | 11.9958 | ft |
| Displacement | 479.5500 | LT |
| LCG (From X=0) | 39.7000 | ft |
| Heel Angle | 0.0000 | Deg |
| Distance to Amidships (from X=0) | 44.0000 | ft |
| VCG (From BL) | 11.7000 | ft |
| TCG (From CL) | 0.0100 | ft |
| Density | 0.0279 | LT/ft^3 |
| Hog/Sag Distance at Amidships (+Hog) | 0.0000 | ft |
| Wave Type | None | |
| Wave Start (from X=0) | 0.0000 | ft |
| Wave Height | 1.0000 | ft |
| Wave Length | 1.0000 | ft |

Upright Condition

| | | |
|---|---|---|
| Draft (BL - WL) | 8.9304 | ft |
| Trim Angle | 0.0030 | Deg |
| Displacement | 479.5500 | LT |
| LCG (From X=0) | 39.7000 | ft |
| A-Plane Equation Value | -0.0001 | |
| B-Plane Equation Value | 0.0000 | |
| C-Plane Equation Value | 1.0000 | |
| D-Plane Equation Value | -8.9281 | |

FIG. 16

SINGLE CHINE

| Speed (kts) | UKC (ft) | FWD Barge (lbs) | AFT Barge (lbs) | Towboat (lbs) | Total (lbs) |
|---|---|---|---|---|---|
| 6 | 1 | 34,872 | 20,486 | -9,340 | 46,018 |
| 8 | 1 | 68,517 | 67,605 | -21,418 | 114,705 |
| 10 | 1 | 106,479 | 148,391 | -3,016 | 251,855 |
| 6 | 5 | 14,101 | 8,958 | 5,058 | 28,117 |
| 8 | 5 | 30,091 | 21,731 | 10,347 | 62,170 |
| 10 | 5 | 69,756 | 61,117 | 12,543 | 143,417 |

SINGLE + DOUBLE CHINE

| Speed (kts) | UKC (ft) | FWD Barge (lbs) | AFT Barge (lbs) | Towboat (lbs) | Total (lbs) | Drag Reduction (%) |
|---|---|---|---|---|---|---|
| 6 | 1 | 35,270 | 20,090 | -10,238 | 45,122 | 1.9% |
| 8 | 1 | 68,345 | 68,998 | -26,285 | 111,058 | 3.2% |
| 10 | 1 | 106,160 | 150,219 | 803 | 257,181 | -2.1% |
| 6 | 5 | 13,248 | 7,498 | 4,733 | 25,499 | 9.3% |
| 8 | 5 | 29,926 | 17,209 | 11,203 | 58,337 | 6.2% |
| 10 | 5 | 69,253 | 70,301 | 12,013 | 151,567 | -5.7% |

Drag Reduction = drag reduction compared to single chine baseline case.

DOUBLE CHINE

| Speed (kts) | UKC (ft) | FWD Barge (lbs) | AFT Barge (lbs) | Towboat (lbs) | Total (lbs) | Drag Reduction (%) |
|---|---|---|---|---|---|---|
| 6 | 1 | 34,547 | 21,049 | -11,319 | 44,277 | 3.8% |
| 8 | 1 | 68,643 | 68,165 | -27,848 | 108,960 | 5.0% |
| 10 | 1 | 105,241 | 154,660 | -3,200 | 256,701 | -1.9% |
| 6 | 5 | 14,759 | 7,812 | 4,308 | 26,879 | 7.2% |
| 8 | 5 | 29,853 | 22,776 | 11,781 | 64,410 | -3.6% |
| 10 | 5 | 70,919 | 70,769 | 10,302 | 151,990 | -6.0% |

Drag Reduction = drag reduction compared to single chine baseline case.

PROPELLER WAKE SCORING

| Speed (kts) | UKC (ft) | SINGLE CHINE | | SINGLE+DOUBLE CHINE | | DOUBLE CHINE | |
|---|---|---|---|---|---|---|---|
| 6 | 1 | ○ | 4 | ● | 3 | ◐ | 3 |
| 8 | 1 | ○ | 4 | ● | 7 | ◐ | 3 |
| 10 | 1 | ○ | 5 | ● | 3 | ○ | 4 |
| 6 | 5 | ● | 7 | ● | 9 | ● | 7 |
| 8 | 5 | ○ | 6 | ● | 10 | ● | 9 |
| 10 | 5 | ● | 7 | ● | 7 | ● | 8 |

| 0-3: | ● | UNFAVORABLE |
| 4-6: | ○ | MARGINAL |
| 7-10: | ● | FAVORABLE |

Table 3: Comparison of propeller inflow (nominal wake) results for the single, double, and combined single + double chine hull form configurations.

FIG. 18

HYBRID CHINE BOAT HULL AND METHODS OF MANUFACTURE AND USE

CROSS REFERENCE TO RELATED APPLICATIONS

This application claims the benefit of priority to U.S. Provisional Application No. 62/795,847 filed Jan. 23, 2019, the disclosure of which is incorporated herein by reference.

TECHNICAL FIELD

Aspects of the present disclosure relate generally to ship hulls, and more specifically, but not by way of limitation, to single and double chine ship hulls.

BACKGROUND

Inland push boats generally have a single chine hull design or a double chine hull design. The majority of inland push boat hulls have a single chine hull, i.e., a single ""hard edge"" or sharp transition between a keel or hull bottom and sidewalls of the hull on both sides (i.e., port and starboard) of the hull. Some inland push boats have double chines hulls to increase efficiency and improve maneuvering, i.e., two ""hard edges"" or sharp transitions between the keel or hull bottom and sidewalls of the hull on both sides (i.e., port and starboard) of the hull. To illustrate, the double chine hulls include an intermediate angled portion between the keel or hull bottom and sidewalls of the hull. Although, double chine hull boats have increased efficiency and improved maneuvering, they are more costly to build. For example, double chine hulls often require additional welds, sometimes including multiple passes, along the entire length of the hull to join frame sections of the hull. Additionally, double chine hulls are less stable and slide more when flanking, when the boat is twisting to impart torque on a barge to turn the barge, as compared to single chine hulls. Double chine hulls have increased maintenance costs and service times, as compared to single chine hulls. To illustrate, double chine hulls are harder to dry dock, as compared to single chine hulls, because of the two chines have to be supported and the intermediate angled portion has to be supported. Furthermore, double chine hulls have less capacity for in boundary tanks, often as much as 10-20 percent less as compared to single chine hulls. Accordingly, double chine hull boats have 10-20 percent less operational time and require more frequent stops to fill up on supplies, e.g., water and fuel.

SUMMARY

This disclosure describes hybrid chine hulls and methods of manufacturing and using hybrid chine hulls. A hybrid chine hull design as used herein includes a hull having a first number of chines in one portion (e.g., an aft or fore portion) and a second number of chines is a second portion (e.g., the other of the aft or fore portion). By designing a hull with a particular number of chines in specific areas, the advantages of single chine hulls and double chine hulls can be realized without or while reducing the disadvantages of single and double chine hulls.

For example, a particular hybrid chine hull design includes a single chine hull from a bow, through the midbody, to about a start of a rise of the bottom beginning portion of a stern. At the beginning of the stern, the single chine splits and fares into a double chine hull at or near a transom. The double chine hull continues aftwards towards the stern. By having a single chine hull in a fore portion of the hull and a double chine hull in an aft portion of the hull, the benefits of single chine and double chine hulls can be achieved, as described further herein.

In some such implementations, the upper and lower chines of the double chine come together to merge back into a single chine at or near the stern. Such a configuration may simplify construction and may have a slightly smaller increase in performance for some types of vessels as compared to a double chine stern. For example, the double chine section may have a reduced length, and thus less welds or angled portions are used to build the hull.

In other implementations, particular hybrid chine hull design includes a transition between a single chine hull and a double chine hull in a fore portion of the hull. In such implementations, by having a double chine hull in a fore portion of the hull and a single chine hull in an aft portion of the hull or a majority portion of the hull, the benefits of single chine and double chine hulls can be achieved as described further herein. As compared to hybrid chine hulls with double chine section in an aft portion of the hull, hybrid chine hulls with a double chine section in a fore portion of the hull have similar, albeit lesser, performance advantages as compared to single and double chine hull and have increased storage.

In some implementations, particular hybrid chine hull design includes two double chine sections, such as one double chine section in or near the fore portion of the hull and a second double chine section in or near an aft portion of the hell. In such implementations, the hull includes at least two transitions, i.e., double chine to single chine and single chine back to double chine. In some such implementations, additional single chine sections can be used to reduce construction and maintenance costs. For example single chine sections can be included prior to the first double chine section and/or after the second double chine section. As compared to single chine hulls, double chine hulls, and the above hybrid chine hulls, such a dual double chine section design has improved performance. Such hulls may have higher design costs or complexity and possibly higher costs to build as compared to single chine hulls and other hybrid chine hull designs with only one double chine section.

In some implementations, the hybrid chine hull designs are used on or for inland push boats or offshore supply or crew boats. In other implementations, the hybrid chine hull designs are used in tugboats, other monohull vessels, and/or non-molded hull vessels. When used on or for inland push boats, such hybrid chine hulls offer improved flanking performance allowing or enabling a single push boat to push multiple barges through waterways (e.g., S-curves) where multiple push boats or multiple boats would normally be used. To illustrate, the hybrid chine hull design offers increased power and efficiency in straight line performance and turning performance such that hybrid chine hull designs generate more torque and/or imparts more torque (i.e., twist) on the barge(s) being pushed. Thus, a push boat including such a hybrid chine hull design can perform such complicated procedures with a single boat. In addition, such hybrid chine hulls offer improved flanking performance allowing or enabling a reduction in the number of times/conditions where a larger more powerful boat is used/switched in for a particular maneuver, the number of times/conditions where the multiple barges have to be pushed individually, or the number of times/conditions where the boat would have to stop operating and wait for improved conditions."

Additionally, or alternatively, the hybrid chine hull designs enable quicker and smoother stops (e.g., a full crash-stop). During a full crash-stop, the vessel is transitioned from full ahead to full reverse in a single maneuver (e.g., throttle 100 forward to 100 percent aft). Most single and double chine vessels dip violently forward and into the water and shake forcefully during such a maneuver. Hybrid chine hull designs enable a smoother and quicker stop because the limited double chine portion enables the propellers to push water along the limited double chine portion upwards (i.e., toward the bow) and outwards (i.e., away from the hull in port and starboard directions) more efficiently as compared to single and double chine hulls. Thus, vessels including such hybrid chine hull design are safer to operate, due to reduced full crash-stop times and distances, and require less maintenance, due to reduce shock and vibration generated when operating such vessels.

Some embodiments of the present hybrid chine boat hulls comprise: a keel; a single chine section; and a double chine section distinct from the single chine section with respect to a longitudinal direction of the keel and positioned aft of the single chine section. In some implementations, the keel comprises a flat plate keel.

In some of the foregoing embodiments of the present hybrid chine boat hulls, the single chine section and the double chine section correspond to cross-section portions of the hybrid chine boat hull. In some implementations, the single chine section includes a single chine on each side of the keel, and wherein the double chine section includes an upper chine and a lower chine on each side of the keel.

In some of the foregoing embodiments of the present hybrid chine boat hulls, the hybrid chine boat hulls further comprise vertical sidewalls, a hull bottom and intermediate angled portions, a particular intermediate angle portion positioned between a particular vertical sidewall and the hull bottom, wherein a particular upper chine joins the particular vertical sidewall and the particular intermediate angled portion, and wherein a particular lower chine joins the hull bottom and the particular intermediate angled portion, wherein the intermediate angle portion is angled relative to substantially vertical sidewalls and substantially horizontal to hull bottom.

In some of the foregoing embodiments of the present hybrid chine boat hulls, the hybrid chine boat hulls further comprise a transition between the single chine section and the double chine section, the transition positioned in a fore portion of the hull. In other implementations, the hybrid chine boat hulls further comprise a transition between the single chine section and the double chine section, the transition positioned in a mid-hull portion of the hull or comprise a transition between the single chine section and the double chine section, the transition positioned in an aft portion of the hull.

In some of the foregoing embodiments of the present hybrid chine boat hulls, the hybrid chine boat hulls further comprise a second single chine section, the second single chine distinct from the single chine section and the double chine section with respect to the longitudinal direction of the keel. In some implementations, the second single chine section is positioned aft of the double chine section. In other implementations, the second single chine section is positioned in an aft portion of the hull.

In some of the foregoing embodiments of the present hybrid chine boat hulls, the hybrid chine boat hulls further comprise a second double chine section distinct from the single chine section and the double chine section with respect to the longitudinal direction of the keel. In some implementations, the hybrid chine boat hulls further comprise a third single chine section distinct from the single chine section and the double chine section with respect to the longitudinal direction of the keel. Additionally, or alternatively, the double chine section is positioned in a fore portion and the second double chine section is positioned in an aft portion.

In some of the foregoing embodiments of the present hybrid chine boat hulls, the single chine section includes a single hard chine. In other implementations, the single chine section includes a single soft chine. Additionally, or alternatively, the keel further defines a tunnel cavity.

In some of the foregoing embodiments of the present hybrid chine boat hulls, the hybrid chine boat hulls further comprise one or more storage compartments defined by the hull. In some implementations, the hybrid chine boat hulls further comprise a generally rectangular-shaped upper hull portion. Additionally, or alternatively, the hybrid chine boat hulls further comprise a frame, the frame including a plurality of frame members coupled to the keel.

In some of the foregoing embodiments of the present hybrid chine boat hulls, the hybrid chine boat hulls further comprise a bow and a stern. In some implementations, the bow, the stern, or both, have a single chine.

Some embodiments of the present marine vessels comprise: a hybrid chine hull, the hybrid chine hull comprising: a keel; a single chine section; and a double chine section distinct from the single chine section with respect to a longitudinal direction of the keel; a propulsion system; and a control system. In some implementations, the propulsion system comprises an engine and a propeller.

In some of the foregoing embodiments of the present marine vessels, the control system comprises a controller. Additionally, or alternatively, the control system comprises one or more rudders. In some implementations, the one or more rudders include at least one propulsion rudder and at least one flanking rudder.

In some of the foregoing embodiments of the present marine vessels, a bow of the marine vessel is flat and configured to push one or more barges. In some implementations, the marine vessel comprises an inland push boat. In other implementations, the marine vessel comprises an offshore supply boat.

Some embodiments of the present methods of manufacturing a hybrid chine hull comprise: forming a plurality of frame sections; coupling the plurality of frame sections together along a keel; and coupling a plurality of plates to the plurality of frame sections and the keel to form a single chine section and a double chine section of the hybrid chine hull. In some implementations, coupling the plurality of plates to the plurality of frame sections to form the single chine section includes joining a first plate associated with the keel or hull bottom with a second plate associated with a hull sidewall, the first plate and the second plate forming a large angle corner.

In some of the foregoing embodiments of the present methods, coupling the plurality of plates to the plurality of frame sections to form the double chine section includes joining a third plate associated with the keel or hull bottom with a fourth plate associated with an intermediate portion and include joining a fifth plate associated with the intermediate portion with a sixth plate associated with a hull sidewall, and wherein the third plate and the fourth plate form a large angle corner and the fifth plate and the sixth plate form a large angle corner. Additionally, or alternatively, coupling the plurality of plates to the plurality of frame sections further forms a second single chine section, a third single chine section, a second double chine section, or a combination thereof.

In some of the foregoing embodiments of the present methods, coupling the plurality of plates to the plurality of frame sections further forms one or more tunnel cavities. Additionally, or alternatively, coupling the plurality of plates to the plurality of frame sections comprises welding the plurality of plates to the plurality of frame sections.

Some embodiments of the present methods of using a hybrid chine hull comprise: coupling a marine vessel to one or more unpowered vessels, the marine vessel including a hull including a single chine section and a double chine section; and pushing, by the marine vessel, the one or more unpowered vessels. In some of the foregoing embodiments of the present methods implementations, the methods further comprise twisting, by the marine vessel, to steer or turn the one or more unpowered vessels. In some implementations, twisting by the marine vessel includes adjusting a position of a prolusion rudder and a flanking rudder.

In some of the foregoing embodiments of the present methods, the methods further comprise ceasing pushing, by the marine vessel, the one or more unpowered vessels. In some implementations, the methods further comprise decoupling the marine vessel from the one or more unpowered vessels.

In some of the foregoing embodiments of the present methods, wherein the one or more unpowered vessels comprises barges. In some implementations, at least one barge of the one or more barges is longer than 250 feet and the at least one barge of the one or more barges has an under keel clearance of 1 foot to 10 feet, or a combination thereof. Additionally, or alternatively, the marine vessel is operated at a speed of between 3 knots and 15 knots while pushing the one or more unpowered vessels.

Some embodiments of the present methods of performing a full stop with a hybrid chine hull comprise: operating a marine vessel in a forward direction, the marine vessel comprising the hybrid chine hull in a forward direction; activating reverse thrust to cause a propeller to change rotation direction and generate reverse thrust water; and directing the reverse thrust water in a forward direction along the hybrid chine hull to stop forward motion of the marine vessel. In some implementations, the reverse thrust water is directed down each side of the hybrid chine hull and towards a bow of the marine vessel, wherein the reverse thrust water enables improved backing down and reverse steering capability.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically. Additionally, two items that are "coupled" may be unitary with each other. To illustrate, components may be coupled by virtue of physical proximity, being integral to a single structure, or being formed from the same piece of material. Coupling may also include mechanical, thermal, electrical, communicational (e.g., wired or wireless), or chemical coupling (such as a chemical bond) in some contexts.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. As used herein, the term "approximately" may be substituted with "within 10 percent of" what is specified. Additionally, the term "substantially" may be substituted with "within [a percentage] of" what is specified, where the percentage includes 0.1, 1, or 5 percent; or may be understood to mean with a design, manufacture, or measurement tolerance. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any aspect of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Some details associated with the aspects of the present disclosure are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 15 is a side view of an example of a marine vessel including a hybrid chine hull on which computational fluid dynamic (CFD) testing was performed;

FIG. 16 illustrates parameters and conditions used for performing CFD analysis on the marine vessel of FIG. 15;

FIG. 17 is a table illustrating drag results of the CFD analysis of the marine vessel of FIG. 15; and FIG. 18 is a table illustrating wake results of the CFD analysis of the marine vessel of FIG. 15.

DETAILED DESCRIPTION

Figure 1:
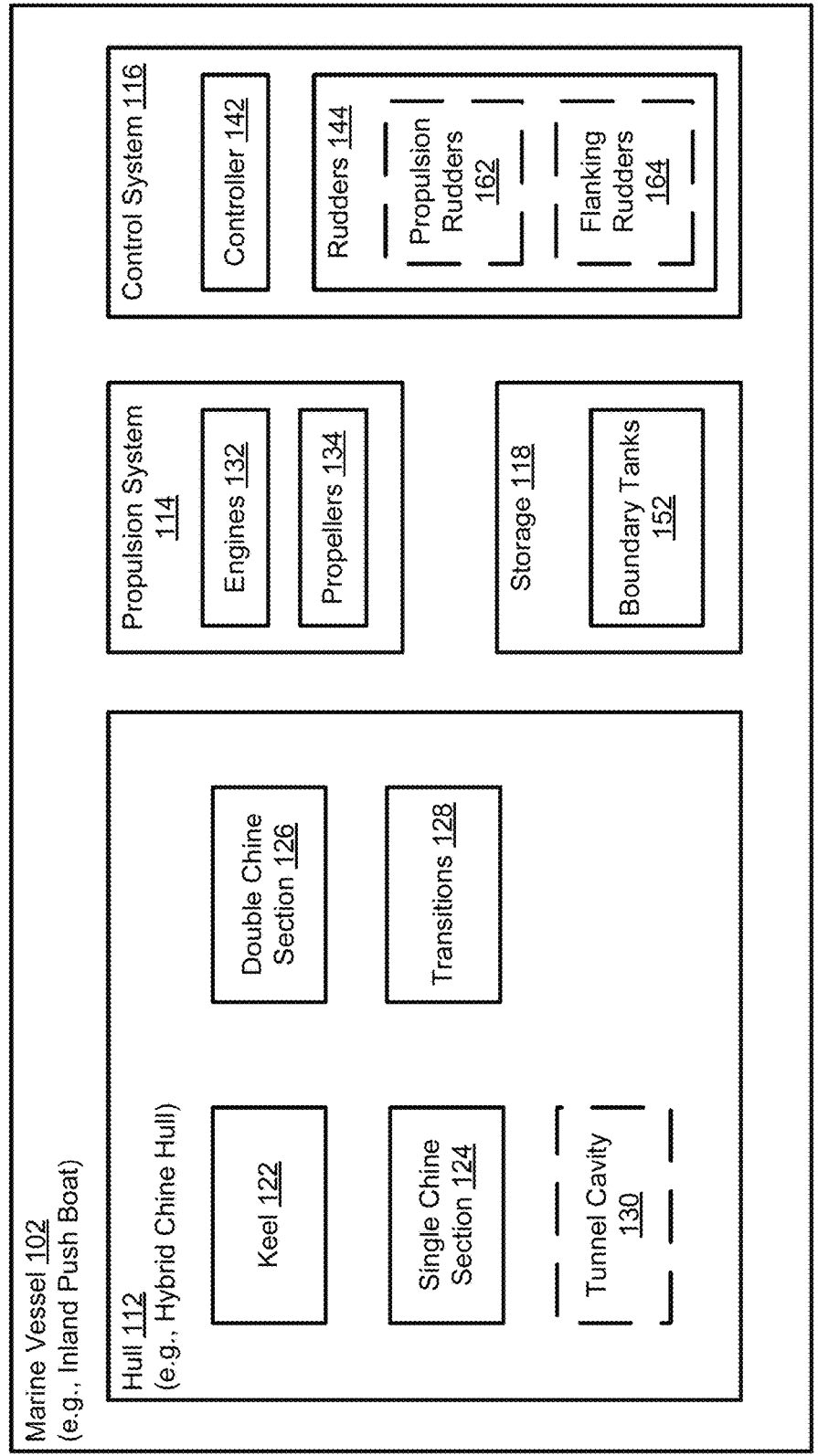
FIG. 1 is a block diagram of an example of marine vessel.

FIG. 1 illustrates a block diagram 100 of a marine vessel 102. Marine vessel 102 includes a hull 112, a propulsion system 114, a control system 116, and storage 118. Marine vessel 102 may include one or more other components and/or system in other implementations. In some implementations, marine vessel 102 includes or corresponds to an inland push boat. In other implementations, marine vessel 102 includes or corresponds an offshore supply or crew boat. In other implementations, marine vessel 102 may another type of vessel, such as an unpowered vessel.

Hull 112 includes a keel 122, a single chine section 124, a double chine section 126, and at least one transition 128. Keel 122 is a structural member that runs along a majority or an entirety of a centerline of marine vessel 102 from bow to stern. Keel 122 is configured to provide marine vessel 102 control and stability and reduces side to side "slipping." In some implementations, keel 122 is a fixed keel, such as a flat plate keel. Other examples of fixed keels include a full keel, a long keel, a fin keel, a winged keel, a bulb keel, a bar keel, or a bilge keel.

Single chine section 124 include a single chine. A chine, as used herein, is a "sharp" or large angle in a cross-section of hull 112. Thus, a no or zero chine hull has hull cross-section that gradually changes or is rounded, such as a gently curving cross-section or S-bottom hull. The single chine may be a "hard chine" or a "soft chine." A hard chine is where two sides meet at a relatively steep angle and has little to no rounding, while a soft chine is where two sides meet at a relatively shallower angle and has a larger degree of rounding where two planes of the hull 112 come together here to form the chine. In some implementations, single chine section 124 includes a single chine on each side of the keel 122, i.e., the keel 122 does not include or correspond to a chine of the single chine section 124. In a particular implementation, the keel 122 does include or correspond to a separate chine, such as flat plate keel. In such implementations, the hull 112 will often have one panel or plane (made of multiple panels aligned along the plane) that forms the hull section on each side of the keel 122. Alternatively, the keel 122 may include a chine or correspond to a chine, i.e., have a hard edge. Thus, when the keel 122 is or forms the chine, a particular cross-section of hull 112 may have three chines and be referred to as a triple chine hull.

Double chine section 126 includes two chines, such as an upper chine and a lower chine. In some implementations, double chine section 126 includes two chines on each side of keel 122. The double chine section 126 may include two panels or planes that form the hull section on each side of the keel 122. Thus, the hull 112 may have four chines and be referred to as a 4 chine hull. In some implementations where the keel 122 may include a chine or correspond to a chine, a particular cross-section of hull 112 may have five chines and be referred to as a 5-chine hull. Each of the single chine section 124 and the double chine section 126 may be formed from multiple pieces of material.

A transition 128 or transition section is positioned between the single chine section 124 and the double chine section 126. For example, the single chine of the single chine section 124 may split or fare into two chines, such as the upper and lower chines of double chine section 126 at transition 128. In some implementations, hull 112 includes another single chine section or another double chine section. In such implementations, hull 112 includes another transition, as described with reference to FIGS. 2A-2C.

Placement of the single chine section 124 and the double chine section 126 can vary according to marine vessel 102 size and design characteristics. For example, for an inland push boat, single chine section 124 may be positioned in a forward hull section and/or mid-hull section and double chine section 126 may be positioned aftward of the single chine section 124. In such implementations, single chine hull section 124 provides stability along a fore portion of hull 112 and double chine section 126 provides efficiency and maneuverability in an aft section of hull 112.

In some implementations, hull 112 includes or defines a tunnel cavity 130 to direct water towards propulsion system 114. Tunnel cavity 130 can be formed into and/or defined by the hull bottom. Additionally, tunnel cavity can be defined by single chine section 124, double chine section 126, or a combination thereof.

Propulsion system 114 includes engine(s) 132 and propeller(s) 134. As an illustrative, non-limiting example, propulsion system 114 includes two engines 132 and two propellers, each engine 132 coupled to a corresponding propeller 134. Engine 132 may be an inboard engine or an outboard engine. In some implementations, engine 132 is a diesel powered engine. In other implementations, engine 132 is a gasoline powered engine or a turbine engine. Additionally, or alternately, engine 132 includes or corresponds to an electric engine. In some such implementations, engine 132 includes or corresponds to a hybrid engine (e.g., a diesel and electric powered engine). In some implementations, marine vessel 102 further includes a generator.

Control system 116 includes a controller 142 and one or more rudders 144. Controller 142 may include one or more processors couple to one or more memories. The processors are configured to execute instructions stored in the one or more memories. Controller 142 is configured to control components of propulsion system 114, components of control system 116, or a combination thereof. For example, controller 142 may include hardware, software (e.g., one or more instructions) and/or firmware configured to process received inputs, generate control signals, and provide control signals to components of propulsion system 114 and/or components of control system 116.

Rudders 144 are configured to control and steer marine vessel 102. As illustrated in the example of FIG. 1, rudders 144 include propulsion rudders 162 and flanking rudders 164. Propulsion rudders 162 are configured to steer or control marine vessel 102 and flanking rudders 164 are configured to control marine vessel during backing and flanking, and optionally are configured to control one or more other vessels. For example, flanking rudders 164 are positioned forward of propellers 134 and can be turned in a direction opposite of propulsion rudders 162 to twist marine vessel 102. Twisting (e.g., spinning) marine vessel 102 can be used to impart torque or a sideways force on the other vessel which causes the other vessel to turn. In a particular implementation, flanking rudders 164 are retractable. For example, flanking rudders 164 are attached to one or more link members to form a linkage configured to retract flanking rudders 164 into a recess defined in hull 122. In other implementations, rudder 144 includes or corresponds to a single rudder.

Storage 118 includes one or more structures and/or cavities configured to hold provisions, cargo, or both. As illustrated in the example of FIG. 1, storage 118 includes boundary tanks 152. Boundary tanks 152 are configured to store fluids, such as gas, oil, water, etc. Increasing a size of boundary tanks 152 enables marine vessel 102 to operate for longer periods of time before refueling. A single chine section 124, especially around a mid-hull portion of marine vessel 102, provides for larger volume or capacity boundary tanks 152, as compared to double chine section 126. Thus, by employing a single chine section 124 in a mid-hull portion, larger volume or capacity boundary tanks 152 can be achieved.

During operation, marine vessel 102 can be operated in accordance with a type of the vessel and/or a type of hull 112. For example, when marine vessel 102 is an offshore supply boat, marine vessel 102 can be loaded with provisions and cargo and operated in the ocean to bring the provisions and cargo to off-shore oil rigs. As another example, when marine vessel 102 is an inland push boat, marine vessel can be loaded with fuel and other provisions to push and steer unpowered vessels, such as barges, to a destination. To illustrate, one or more barges may be lined up end to end. The barges may include vessels of over 300 feet in length. Marine vessel 102 may operate propulsion system 114 to arrange a bow of marine vessel 102 to contact or couple with a stern of one of the one or more barges. The marine vessel 102 may be operated to push the one or more barges to the destination and decouple from the one or more barges after arriving at the destination. As illustrative, non-limiting examples of operational characteristics of the marine vessel 102 while pushing the one or more barges to the destination, marine vessel may be operated at 3 to 15 knots. Additionally, or alternatively, the one or more barges may have a barge under keel clearances of 1 foot to 10 feet.

During the trip, marine vessel 102 may perform one or more flanking maneuvers to steer the one or more barges along inland waterways. To illustrate, the control system 116 may send control signals to propulsion rudders 162 and flanking rudders 164 to orient the rudders 162, 164 to produce a twisting force or torque to cause marine vessel 102 to spin. By producing the twitting force or torque while the marine vessel is contacting or coupled to the one or more barges, the one or more barges will begin to twist, thus enabling marine vessel 102 to steer and turn the one or more barges. Operations of marine vessel 102 are described further with reference to FIGS. 13 and 14. Additionally, manufacturing of marine vessel 102 is described further with reference to FIG. 12.

Thus, hull 112 includes discrete sections (e.g., cross-sections) of single chine sections and double chine sections and provides many benefits over single chine hulls and double chine hulls. To illustrate, hull 112 includes the benefits of single chine hulls and double chine hulls, and reduces or eliminates the drawback of single chine hulls and double chine hulls. Accordingly, hull 112 enables marine vessel 102 to have increased maneuverability and efficiency in passing through water (e.g., reduced drag), as compared to single chine hull vessels. Additionally, hull 112 enables marine vessel 102 to have reduce build costs, reduced maintenance costs, increased hull stability, and improved flanking (e.g., barge turning/steering operations), as compared to double chine hull vessels. Consequently, hull 112 may enable safer, more efficient, and more effective marine vessels.

Figure 2A:
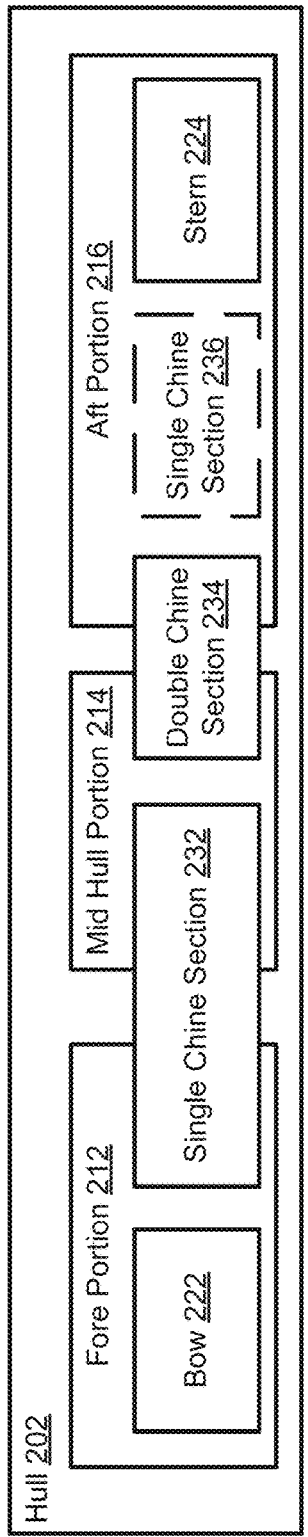
FIG. 2A is a block diagram of an example of a hull of the marine vessel of FIG. 1.
Figure 2B:
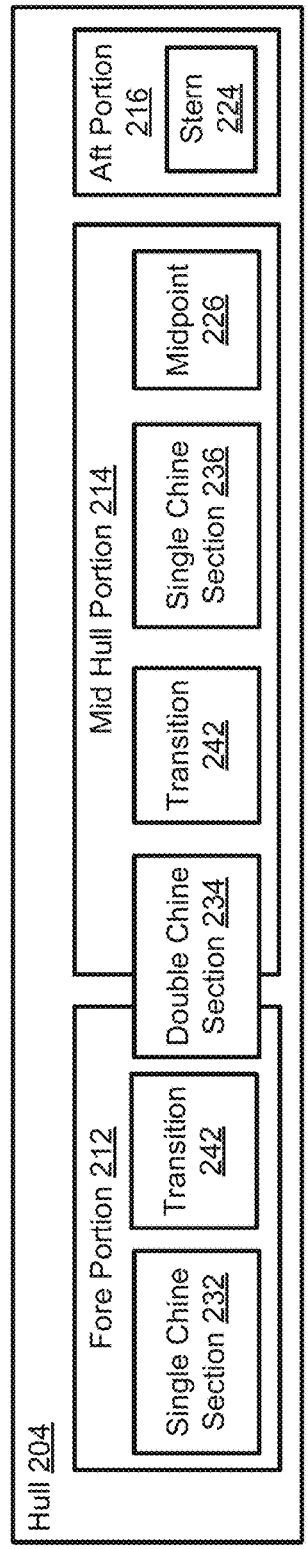
FIG. 2B is a block diagram of another example of a hull of the marine vessel of FIG. 1.
Figure 2C:
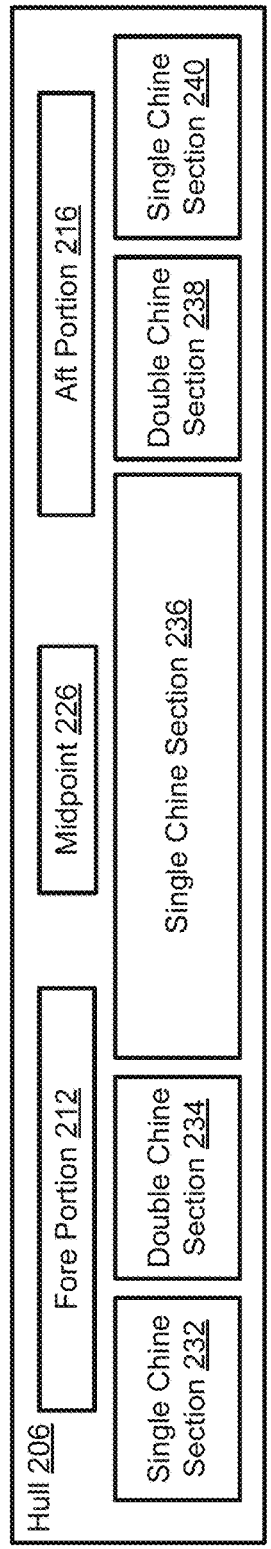
FIG. 2C is a block diagram of another example of a hull of the marine vessel of FIG. 1.

FIGS. 2A-2C are each a block diagram that illustrate an example of a hull, such as hull 112 of FIG. 1, i.e., examples of hybrid chine hull designs. Referring to FIG. 2A, a block diagram of a hull 202 including a transition between a single chine section 232 and a double chine section 234 is shown. In FIG. 2A, hull 202 includes a fore portion 212, a mid-hull portion 214, and an aft portion 216 Fore portion 212 includes bow 222. As illustrated in FIG. 2A, single chine section 232 (e.g., first single chine section) starts in fore portion 212 (e.g., at bow 222) and extends aftward into mid-hull portion 214 (e.g., near a midpoint of hull 202, such as midpoint 226). Single chine section 232 transitions into double chine section 234, and double chine section 234 extends aftward towards and into aft portion 216. In other implementations, single chine section 232 extends aftward into aft portion 216, and single chine section 232 transitions to double chine section 234 in aft portion 216. In some implementations, hull 202 includes a second single chine section 236, and double chine section 234 transitions into the second single chine section 236. As illustrated in FIG. 2A, double chine section 234 transitions into the second single chine section 236 in aft portion 216.

As compared to single chine hulls, hull 202 has improved maneuverability and is more efficient at passing through water (e.g., reduced drag) and providing smoother water (e.g., less turbulent water and/or less "foamy" water, i.e., a reduced amount of air bubbles in the water) to propellers. Providing smoother water to propellers or propulsion system enables more power to be generated by propellers or propulsion system. As compared to double chine boats, hull 202 has more storage capacity, lower build costs, lower maintenance costs, increased stability, and increased flanking ability (e.g., less slipping when flanking).

Referring to FIG. 2B, a block diagram of a hull 204 including a transition between a single chine section 232 and a double chine section 234 in a fore portion 212 is shown. Hull 204 includes the fore portion 212, a mid-hull portion 214, and an aft portion 216. Fore portion 212 includes a single chine section 232, a first transition 242, and at least a portion of double chine section 234. Mid-hull portion 214 includes midpoint 226 and may optionally include one or more of a portion of double chine section 234, a portion of single chine section 236, or a second transition (e.g., 242). Aft portion 216 includes stern 224 and at least a portion of second single chine section 236. As illustrated in the example of FIG. 2B, double chine section 234 transitions into second single chine section 236 in the mid-hull portion 214 fore of the midpoint 226. In other implementations, double chine section 234 transitions to the second single chine section 236 aft of the midpoint 226. Alternatively, double chine section 234 transitions to the second single chine section 236 in the fore portion 212, and second single chine section 236 extends aftward from fore portion 212 to aft portion 216.

As compared to single chine hulls, hull 204 has improved maneuverability and is more efficient at passing through water (e.g., reduced drag). As compared to double chine boats, hull 204 has more storage capacity, lower build costs, lower maintenance costs, increased stability, and increased flanking ability (e.g., less slipping when flanking). Such benefits may have increased performance and utility for flat bow vessels, such as inland push boats. V-hulls and pointed or narrow bows may not see as large of an improvement over double chine hull as compared to flat bow hulls. As compared to hull 202, hull 204 has increased storage capacity and reduced costs. As compared to hull 204, hull 202 has increased efficiency at passing through water (e.g., reduced drag) and providing smoother water (e.g., less turbulent water and/or less "foamy" water, i.e., a reduced amount of air bubbles in the water) to propellers.

Referring to FIG. 2C, a block diagram of a hull 206 including two double chine sections 234, 238 is shown. Hull 206 includes fore portion 212, aft portion 216, and midpoint 226. As illustrated in the example of FIG. 2C, hull 206 includes a double chine section 234 (e.g., first double chine section) in a fore portion 212 (i.e., fore of midpoint 226) and a second double chine section 238 in an aft portion 216 (i.e., aft of midpoint 226). In other implementations, double chine portions 234, 238 may be in other portions of hull 206. For example, double chine portion 234 may be positioned in a mid-hull portion or may extend into the mid-hull portion. Additionally, or alternatively, second double chine section 238 may be positioned in a mid-hull portion or may extend into the mid-hull portion.

Hull 206 further includes three single chine sections 232, 236, 240. First and third single chine section 232 and 240 are positioned fore and aft of the double chine sections 234, 238, and second single chine section 236 is positioned in between the double chine sections 234, 238. Although three single chine sections are illustrated in FIG. 2C, i.e., single chine sections 232, 236, 240, in other implementations hull 206 includes fewer than three single chine sections (e.g., 1 or 2) or greater than three single chine sections. In implementations with more than three single chine sections, hull 206 may include an additional double chine section.

Hull 206 of FIG. 2C has the benefits of both of hulls 202 and 204 of FIGS. 2A and 2B, as compared to single and double chine hulls. As compared to hulls 202 and 204, hull 206 has increased build costs and maintenance costs and has improved maneuverability and is more efficient at passing through water (e.g., reduced drag).

Although single and double chine sections are illustrated in FIGS. 1 and 2A-2C, in other implementations a hull may include a triple chine section in addition to or in the alterative of a single or double chine section. For example, a triple chine section can be inserted adjacent to a double chine section or a double chine section can be substituted with a triple chine section. Additionally, or alternatively, a single chine section can be substituted for a double chine section or an additional double chine section can be inserted between a triple chine section and a single chine section.

Figure 3:
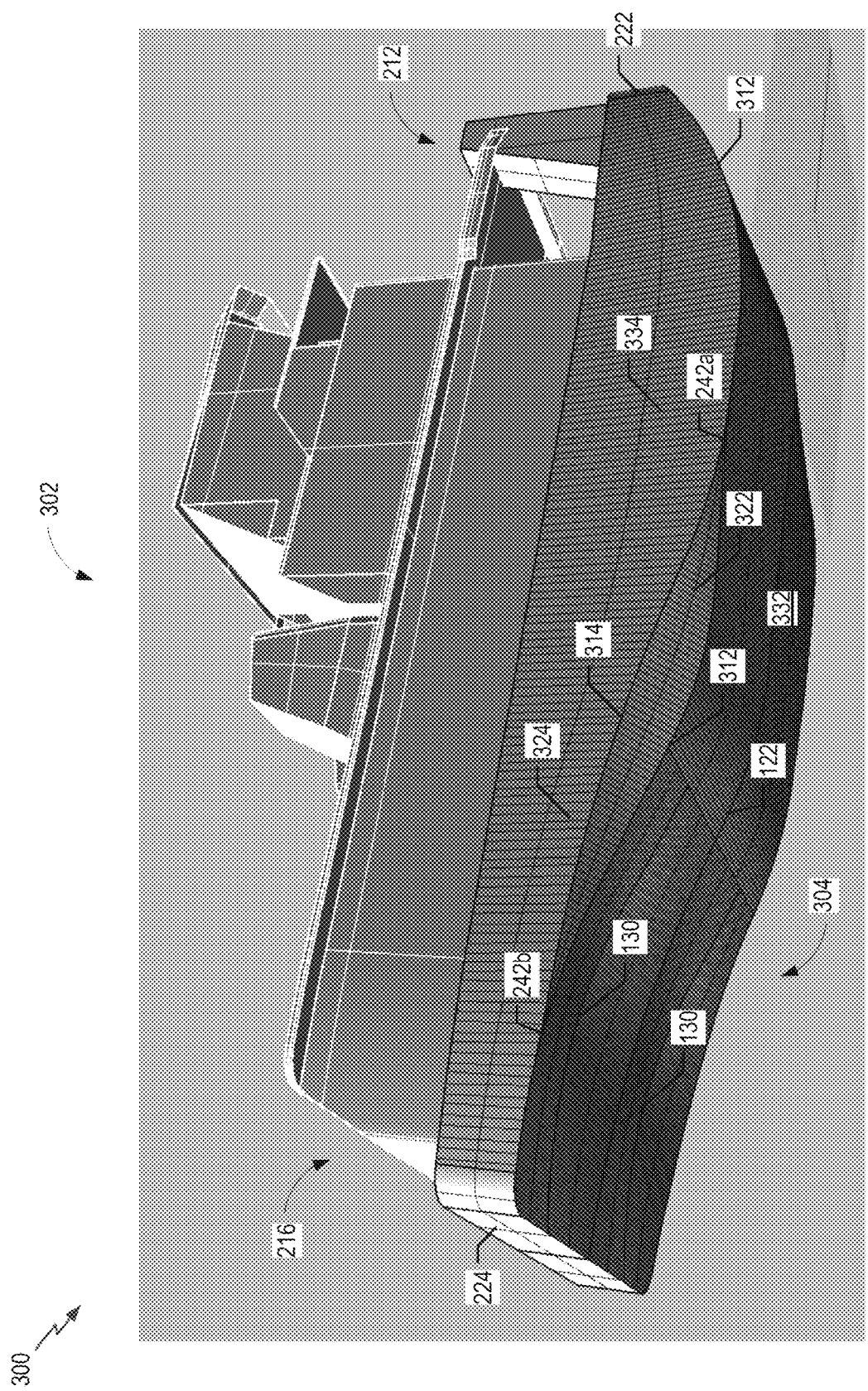
FIG. 3 is a perspective view of an example of a marine vessel including a hybrid chine hull.
Figure 11:
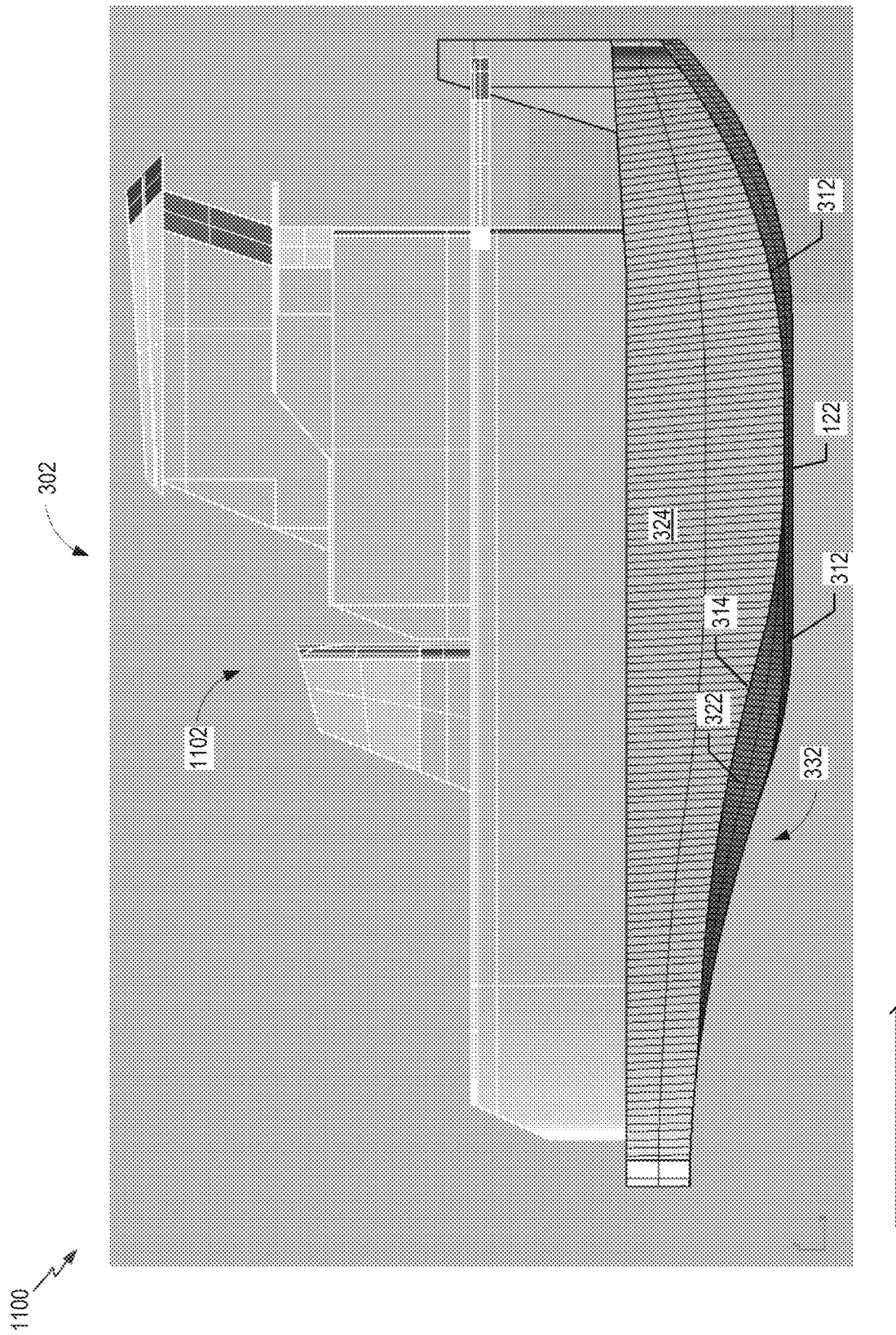
FIG. 11 is a side view of the marine vessel of FIG. 3.

FIG. 3 is a perspective view 300 of an example of a marine vessel 302, such as the marine vessel 102 of FIG. 1, including a hybrid chine hull 304. Perspective view 300 illustrates marine vessel 302 from an aft starboard perspective below the hybrid chine hull 304 and a waterline thereof. An additional side view of marine vessel is illustrated in FIG. 11, as described further herein. Hybrid chine hull 304 may include or correspond to hull 112, hybrid chine hulls 202-206 of FIG. 2, or a combination thereof.

Referring to FIG. 3, hybrid chine hull 304 includes a single chine hull (e.g., single chine section) from bow 222, through the midbody, to about a start of a rise of the bottom beginning portion of stern 224. At the beginning of the stern 224, a single chine (chine 312) splits and fares into a double chine hull at a transom. For example, chine 312 splits into lower chine 312 and upper chine 314 at first transition 242a. The double chine hull continues aftwards towards the stern 224, and in some implementations, the upper and lower chines of the double chine come together to merge back into a single chine. For example, lower chine 312 and upper chine 314 merge together at second transition 242b. As illustrated in FIG. 3, first chine portion 322 (e.g., an intermediate angled portion) has an elliptical shape and is angled relative to hull bottom 332 and sidewall 334. In other implementations, first chine portion 322 has another shape, such as a diamond shape, a rectangular shape, a kite shape, etc. Each of chines 312, 314 may include or correspond to a soft chines, a hard chine, or a combination thereof. For example, a first portion of chine 312 may be a hard chine and a second portion of chine 312 may be a soft chine, such as have a shallower angle or a larger rounding amount as compared to the first portion of chine 312.

As illustrated in FIG. 3, hybrid chine hull 304 includes a hull bottom 332 extending from bow 222 to stern 224. Keel 122 is relatively flat or perpendicular to the water and may include or correspond to hull bottom 332. The lower chine 312 (e.g., first chine) separates a first chine portion 322 from the keel 122 or hull bottom 332. The upper chine 314 (e.g., second chine) separates the first chine portion 322 from a second chine portion 324. As illustrated in FIG. 3, the second chine portion 324 includes or corresponds to sidewall 334 of hybrid chine hull 304, such as a vertical sidewall. In some implementations, the first chine 312 (i.e., the lower chine) may fare into or combine with the keel 122.

In FIG. 3, first chine portion 322 (e.g., intermediate angled portion) is angled at a 45 degree angle relative to the hull bottom 332 and relative to the second chine portion 324 (e.g., sidewall). The angles corresponds to an "inside" or interior angles between the first chine portion 322 and the hull bottom 332 and the second chine portion 324. In implementations where an angle between the hull bottom 322 and the second chine portion 324 (e.g., sidewall) is 90 degrees, each chine angle of the lower and upper chines 312, 314 is 45 degrees as well. Thus, the change in direction for water flowing against hull 304 is the same at the first chine (e.g., lower chine 312) and at the second chine (e.g., upper chine 314). Accordingly, the hull 304 may experience smoother performance in a variety of conditions (e.g., speeds, maneuvers, barge under keel clearance, etc.).

In other implementations, the first chine portion 322 has a different angle relative to the hull bottom 332, to the second chine portion 324 (e.g., sidewall), or both. For example, the first chine portion 322 may be angled at a 30 degree angle relative to the hull bottom 332 and a 60 degree angle relative to the second chine portion 324 (e.g., sidewall), or vice versa. Accordingly, the first chine portion 322 (e.g., intermediate angled portion) may be angled at 25-70 degree angles relative to the hull bottom 332, to the second chine portion 324 (e.g., sidewall), or both. Additionally, or alternatively, the angle between the hull bottom 322 and the second chine portion 324 (e.g., sidewall) may be greater than 90 degrees or less than 90 degrees. Although the change in direction for water flowing against hull 304 may not be the same at the first chine (e.g., lower chine 312) and at the second chine (e.g., upper chine 314) in such implementations, the hull 304 may experience more efficient performance for select conditions (e.g., speeds, maneuvers, barge under keel clearance, etc.), as compared to equal chine angle configurations and/or 90 degree or right angle hull configurations (e.g., flat bottom hulls with vertical sidewalls). Additionally, design or manufacturing constraints, such as interior hull framing and/or bulkhead or girder location, can cause the chine angles to vary.

Figure 4A:
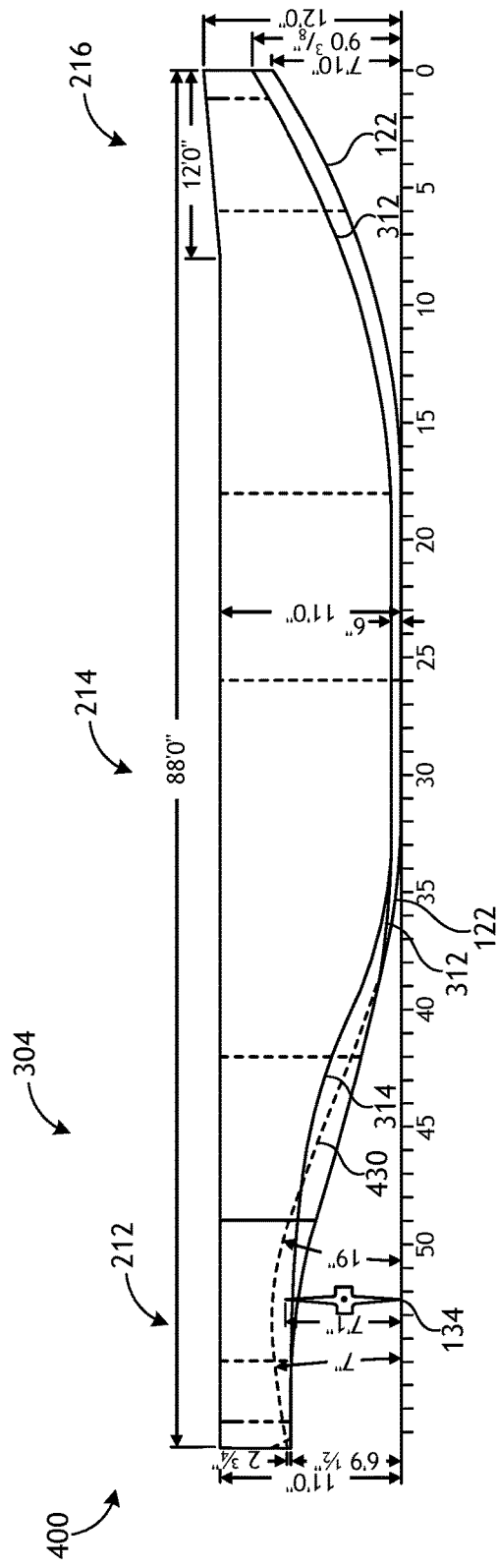
FIG. 4A is a side view (profile view) of an example of the hybrid chine hull of the marine vessel of FIG. 3.
Figure 4B:
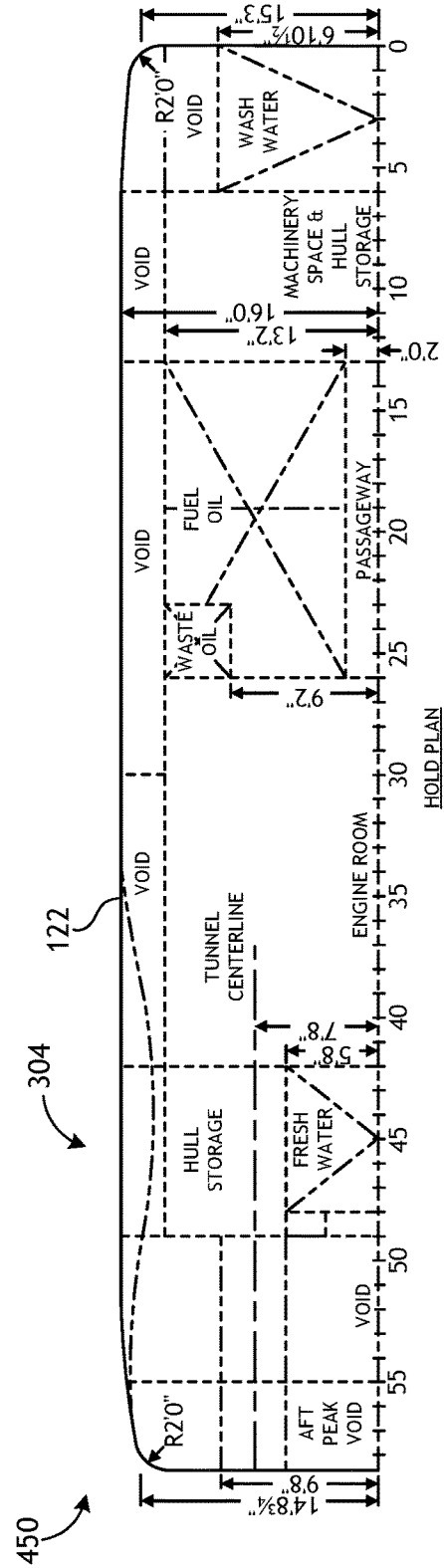
FIG. 4B is a side cross-section view (hold plan view) of the hybrid chine hull of FIG. 4A.

FIGS. 4A and 4B illustrate side views of an example of hull 112 of FIG. 1, such as hybrid chine hull 304 of FIG. 3. FIG. 4A illustrates a profile view 400 of a lines drawing of an example of hull 304, and FIG. 4B illustrates a hold plan view 450 (i.e., a cross-section view) of the lines drawing of the example of hull 304 of FIG. 4A. Referring to FIG. 4A, profile view 400 depicts a starboard side view of hull 304. Hull 304 includes a fore portion 212, a mid-hull portion 214, and an aft portion 216. Expanded views of fore portion 212 and aft portion 216 of FIG. 4A, are shown and described further with reference to FIGS. 7 and 8 respectively.

Referring to FIG. 4B, hold plan view 450 includes depictions of an exemplary layout of components and storage sections of storage 118 of hull 304 for an inland push boat. As illustrated in FIG. 4B, hull 304 includes dry voids that extend a majority or an entirety along a length of the hull 304 from bow to stern. Such "full-length" dry voids add protection and stability. In other implementations, layout of components and storage sections of can be different. For example, one or more positions and/or sizes of a component or a storage space may be different. Additionally, or alternatively, hull 304 may include one or more additionally components, one or more illustrated components may be removed, or a combination thereof.

Figure 5:
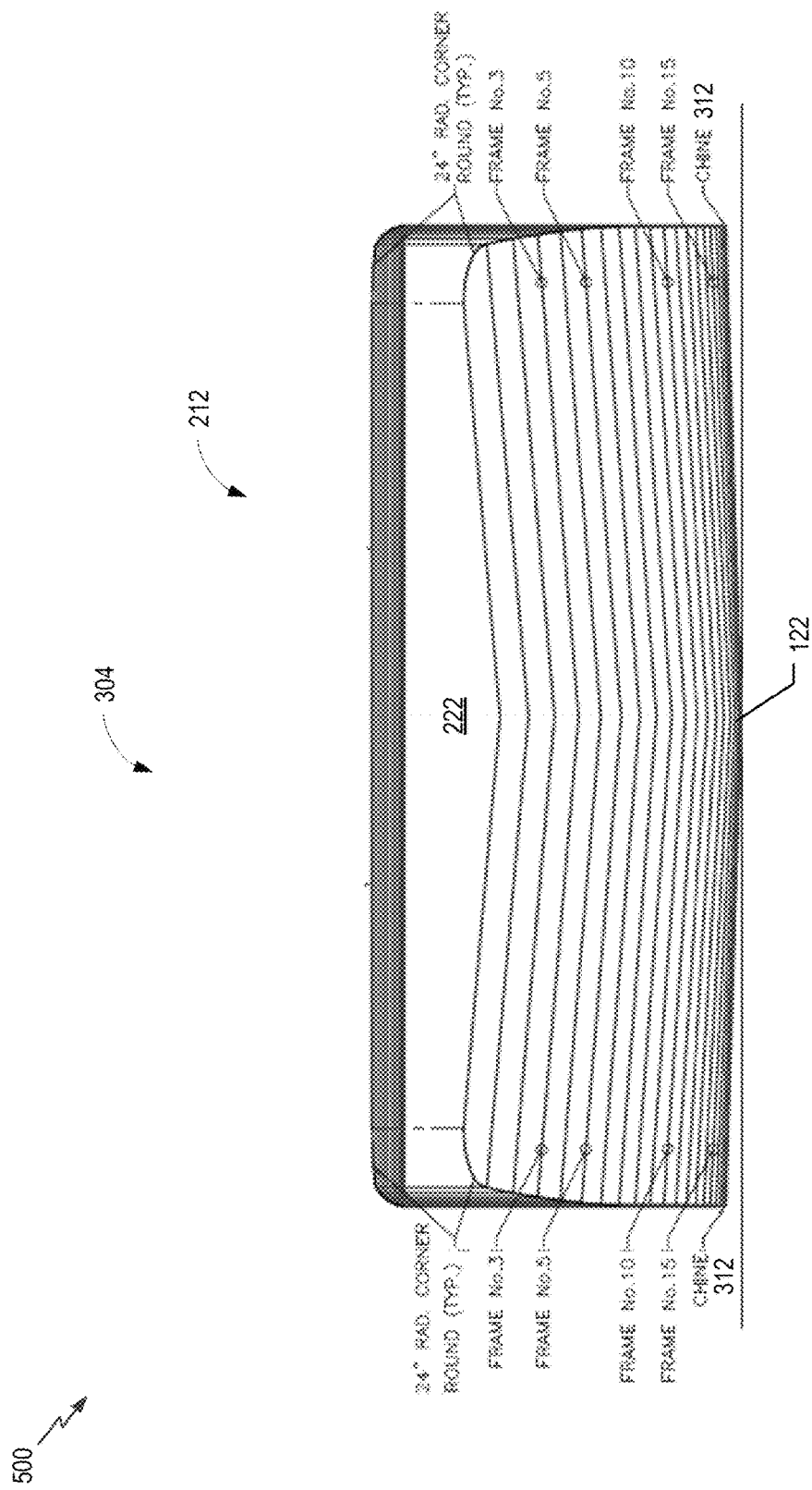
FIG. 5 is a body plan view of an example of the hybrid chine hull of FIG. 4A.
Figure 6:
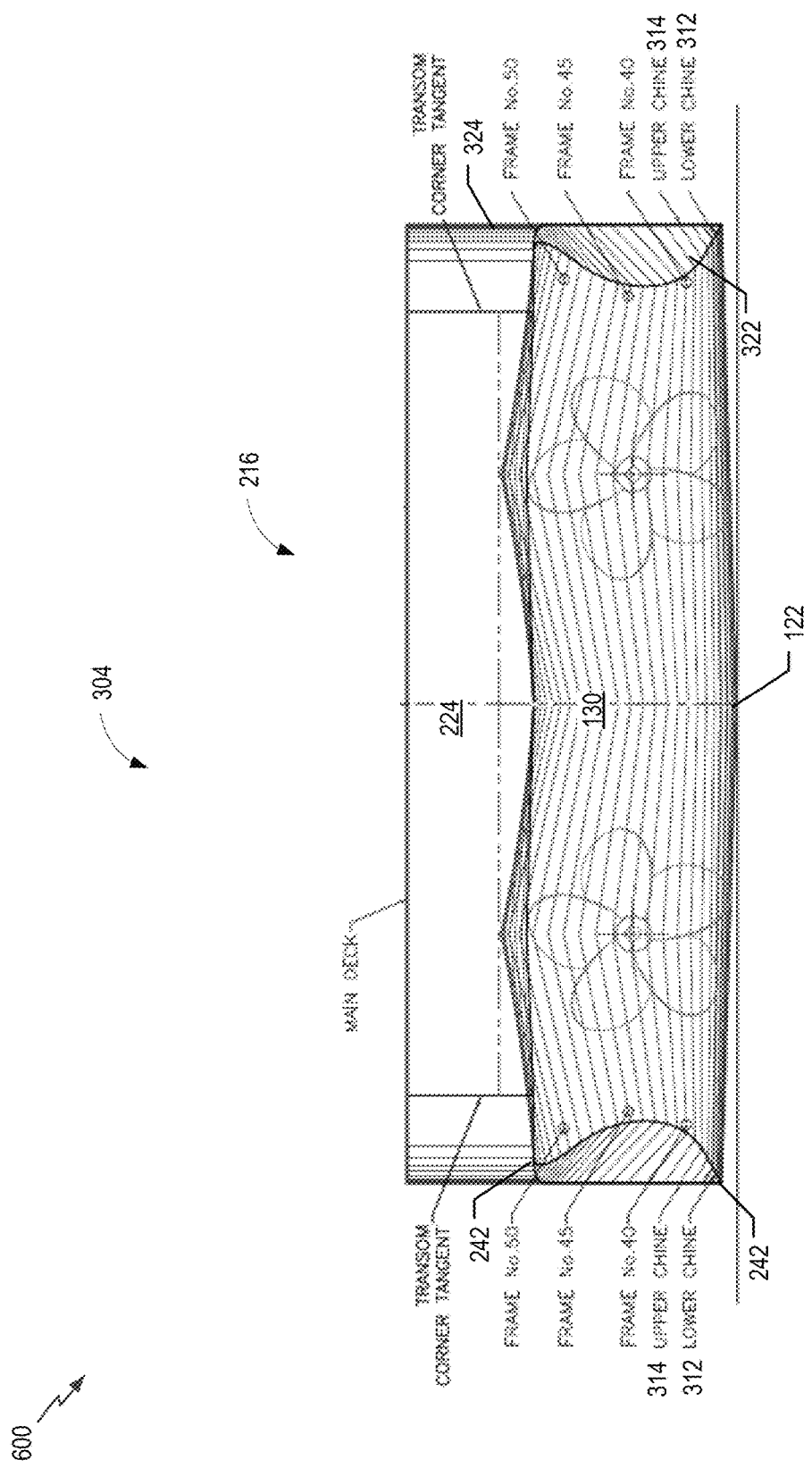
FIG. 6 is a body plan view of an example of the hybrid chine hull of FIG. 4A.

FIGS. 5 and 6 illustrate body plan views of the lines drawing of hybrid chine hull 304 of FIG. 3. Referring to FIG. 5, body plan view 500 depicts the hybrid chine hull 304 of FIG. 3 from the front and frame lines thereof. Fore portion 212 includes bow 222 and a plurality of frames, illustrated by frame lines. FIG. 5 also illustrates keel 122 and chine 312. As illustrated in FIG. 5, keel 122 is slightly curved upwards as the keel 122 or hull bottom extends outwards to sides of the hull 304. Additionally, a top portion of the hull 304 is slightly curved upwards as the keel 122 or hull bottom extends forward to the bow 222.

Referring to FIG. 6, body plan view 600 depicts the hybrid chine hull 304 of FIG. 3 from the back and frame lines thereof Aft portion 216 includes stern 224 and a plurality of frames, illustrated by frame lines. FIG. 6 also illustrates keel 122 and tunnel cavity 130. In FIG. 6, lower chine 312 and upper chine 314 diverge from each other at first transition 242a and merge together at second transition 242b. Lower chine 312 and upper chine 314 define first chine portion 322. Upper chine 314 separates the first chine portion 322 from the second chine portion 324 (i.e., hull sidewall as illustrated in FIG. 6). Lower chine 312 separates first chine portion 322 from keel 122 or hull bottom (e.g., 332) in between transitions 242a and 242b, and lower chine 312 separates hull sidewall (e.g., 334) from keel 122 or hull bottom (e.g., 332) fore of first transition 242a and aft of second transition 242b.

Figure 7:
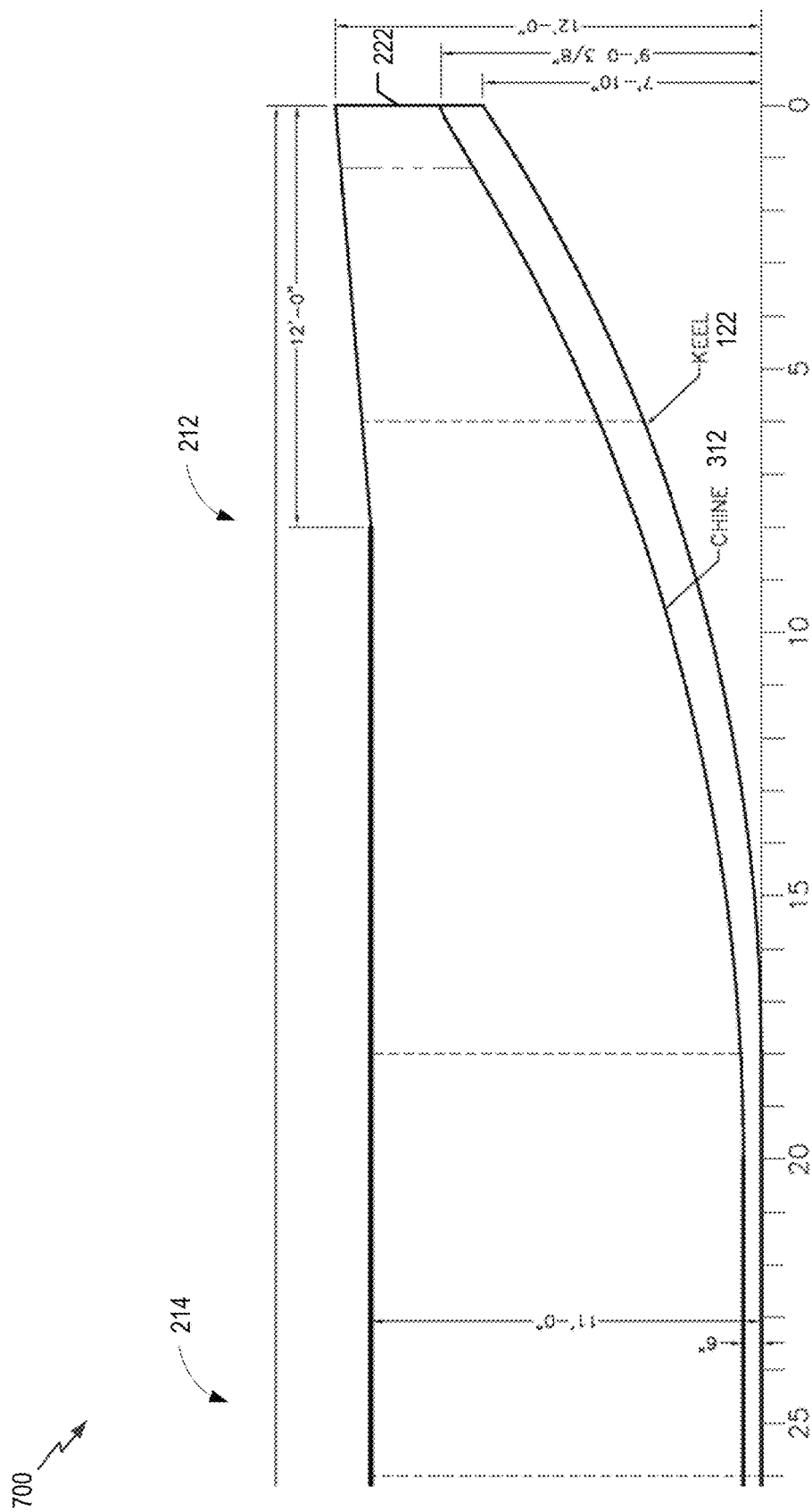
FIG. 7 is an expanded view of a fore portion of the profile view of the hybrid chine hull of FIG. 4A.
Figure 8:
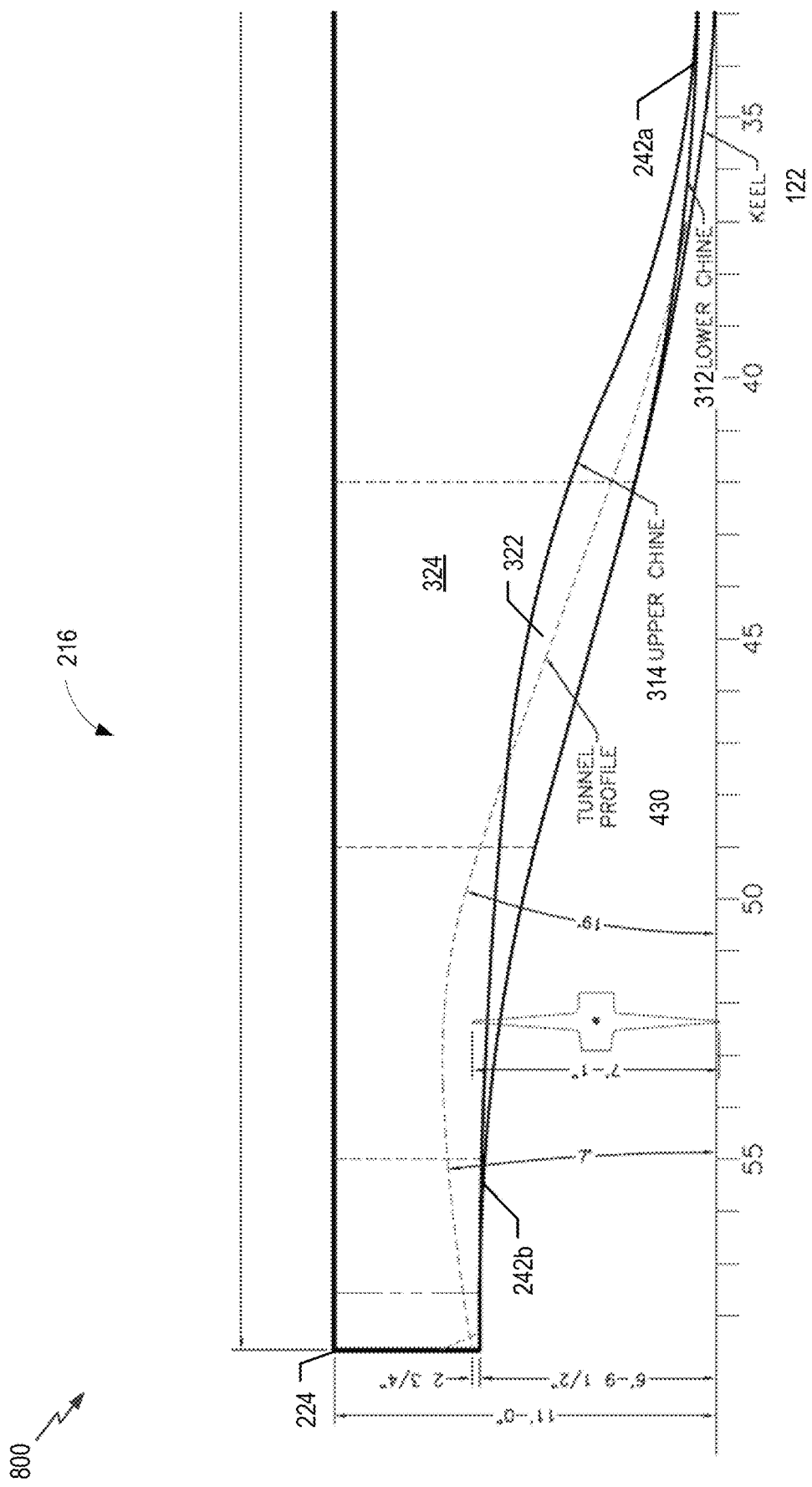
FIG. 8 is an expanded view of an aft portion of the profile view of the hybrid chine hull of FIG. 4A.

FIGS. 7 and 8 illustrate expanded views of the side view (profile view) the hybrid chine hull 304 of FIG. 4A. Referring to FIG. 7, an expanded view of the fore portion 212 of the hybrid chine hull 304 is illustrated. Fore portion 212 includes bow 222. FIG. 7 also illustrates keel 122 and chine 312 (e.g., single chine). In FIG. 7, chine 312 begins at bow 222 and extends aftward. Chine 312 has a shape similar to keel 122 from a side perspective. As illustrated in FIG. 7, hybrid chine hull 304 includes a single chine section (e.g., 232) that extends from bow 222 aftwards through fore portion 212 and into mid-hull portion 214. Single chine 312 separates keel portion or hull bottom from hull sidewall.

Referring to FIG. 8, an expanded view of the aft portion 216 of the hybrid chine hull 304 is illustrated. Aft portion 216 includes stern 224. FIG. 8 also illustrates keel 122, lower chine 312, and upper chine 314. In FIG. 8, single chine 312 splits and fares into upper and lower chines 312, 314 at first transition 242a. The upper and lower chines 312, 314 continue aftwards towards the stern 224, and the upper and lower chines 312, come together to merge back into a single chine 312. For example, lower chine 312 and upper chine 314 merge at second transition 242b. As illustrated in FIG. 8, first chine portion 322 has an elliptical shape and is angled relative to hull bottom (e.g., 332) and second chine portion 324, such as vertical hull sidewall (e.g., 334,). In other implementations, first chine portion 322 has another shape, such as a diamond shape, a rectangular shape, a kite shape, etc. Each of chines 312, 314 may include or correspond to a soft chines, a hard chine, or a combination thereof. For example, a first portion of chine 312 may be a hard chine and a second portion of chine 312 may be a soft chine, such as have a shallower angle or a larger rounding amount as compared to the first portion of chine 312.

As illustrated in FIG. 8, first chine 312 (i.e., lower chine) separates a first chine portion 322 from the keel 122 or hull bottom (e.g., 332). The second chine 314 (i.e., upper chine) separates the first chine portion 322 from the second chine portion 324. As illustrated in FIG. 8, the second chine portion 324 includes or corresponds to a sidewall (e.g., 334) of hybrid chine hull 304, such as a vertical sidewall. FIG. 8 further illustrates tunnel profile 430, which defines tunnel cavity, such as tunnel cavity 130 for a corresponding propeller 134. In the example illustrated in FIG. 8, tunnel profile 430 begins near first transition 242a and extends aftwards to stern 224. As tunnel profile 430 extends aftwards, a beginning portion of tunnel profile 430 has a lower or more gradual increase in height (e.g., reduction in depth or keel depth) as compared to upper chine 314, and tunnel profile 430 has a longer period of increase, resulting in a larger total increase in height (e.g., reduction in depth). Tunnel profile 430 begins to decrease in height (e.g., increase depth or keel depth) near propeller 134 as tunnel profile 430 continues aftwards to end at stern 224.

Figure 9:
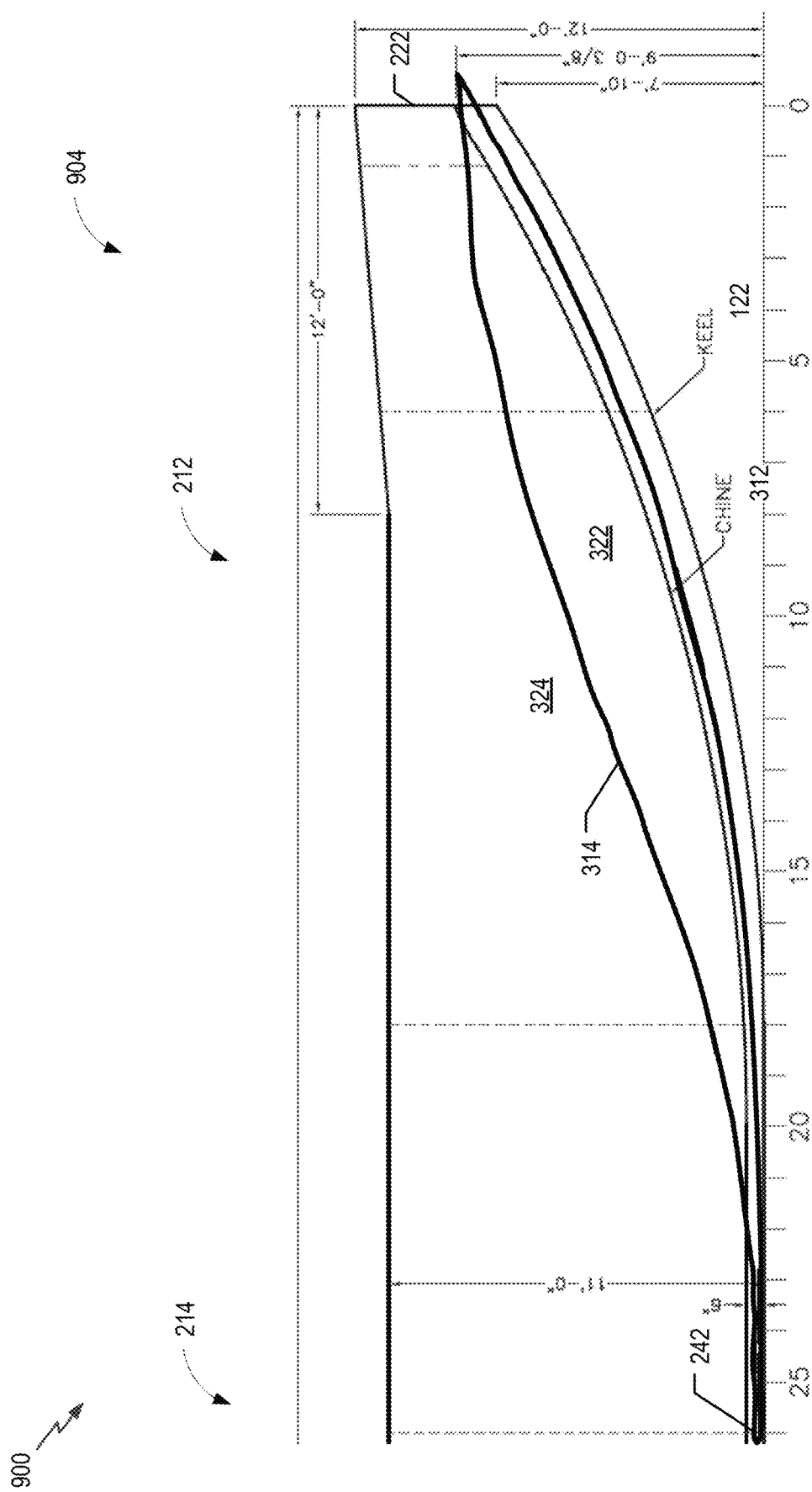
FIG. 9 is an expanded view of a fore portion of a profile view of another example of a hybrid chine hull.
Figure 10:
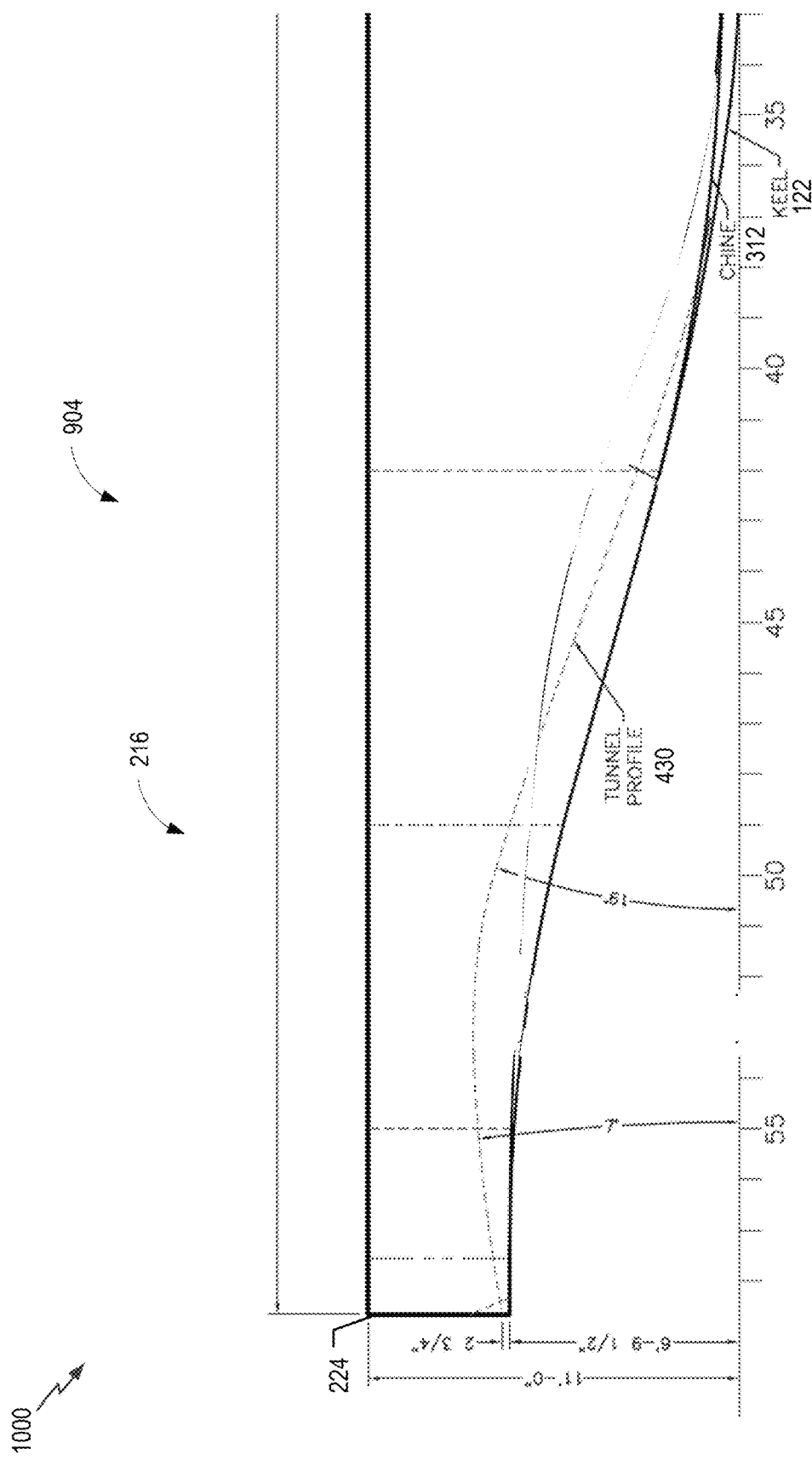
FIG. 10 is an expanded view of an aft portion of a profile view of another example of a hybrid chine hull.

FIGS. 9 and 10 illustrate side views of another example of a hybrid chine hull 904. Referring to FIG. 9, profile view 900 depicts an expanded side view of a fore portion 212 of hybrid chine hull 904. Fore portion 212 includes bow 222.

FIG. 9 also illustrates keel 122, lower chine 312, and upper chine 314. In FIG. 9, upper chine 314 begins at bow 222 and extends aftward towards mid-hull portion 214 (e.g., a midpoint 226). Lower chine 312 begins at or near bow 222 and extends aftwards towards mid-hull portion 214. Lower chine 312 and upper chine 314 merge into a single chine, chine 312, to form or transition to single chine section 236 at transition 242. As illustrated in FIG. 9, the lower chine 312 has a similar shape as the keel 122. To illustrate, lower chine 312 has a similar shape from a side perspective and a distance between the lower chine 312 and the keel 122 is similar. As illustrated in FIG. 9, hybrid chine hull 904 includes a double chine section (e.g., 234) that transitions to a single chine section (e.g., 236) at transition 242. In other implementations, upper chine 314 begins near bow 222 at a second transition point. In such implementations, hybrid chine hull 904 includes a single chine section (e.g., 232) prior to double chine section (e.g., 236), similar to hull 204 as illustrated in FIG. 2B.

As compared to single chine hulls, hybrid chine hull 904 may have increased performance and utility for flat hulled and/or wider vessels, such as inland push boats. V-hulls and pointed or narrow bows may have a smaller benefit as compared to flat hulled and/or wider vessels.

Referring to FIG. 10, a profile view 1000 depicting an expanded side view of an aft portion 216 of hybrid chine hull 904 is illustrated. In FIG. 10, aft portion 216 includes a single chine section and does not include a double chine section. As illustrated in FIG. 10, aft portion 216 of hull 204 includes chine 312, i.e., a single chine. Single chine 312 starts from stern 224 and extends forward towards the bow.

In FIG. 10, the single chine 312 has a similar shape as the keel 122, such as, from a side view perspective, single chine 312 merges with keel 122 and follows an outline of the keel 122. Additionally, a distance between the single chine 312 and the keel 122 reduces from a side view perspective. To illustrate, keel 122 does not extend into the water, downward as illustrated in FIG. 10, further than the single chine 312 for a majority of aft portion 216.

As compared to hybrid chine hull 304, hybrid chine hull 904 may have more capacity in boundary tanks and has a more stable fore portion and bow. Additionally, because of the smaller double chine section of hybrid chine hull 904, hybrid chine hull 904 may be operated at more efficiently at higher speeds than hybrid chine hull 304.

Although measurements are illustrated in FIGS. 7-10, other measurements may be used. For example, marine vessels may be of any size. Based on size, proportions may be adjusted to achieve better performance. As an illustrative, non-limiting example, another hybrid chine hull and/or marine vessel is approximately 90 feet long and 35 feet wide.

Referring to FIG. 11, a side view 1100 depicting a starboard side view of marine vessel 302 of FIG. 3 is illustrated. As illustrated in FIG. 11, marine vessel 302 includes a particular deck configuration 1102 including a cabin and an elevated control bridge. Arrow 1122 illustrates a longitudinal direction of keel 122. The single and double chine sections represent cross-sections of hull 304 and are distinct or separate from each other with respect to the longitudinal direction of the keel 122. In other implementations, marine vessel 302 include another deck configuration.

Figure 12:
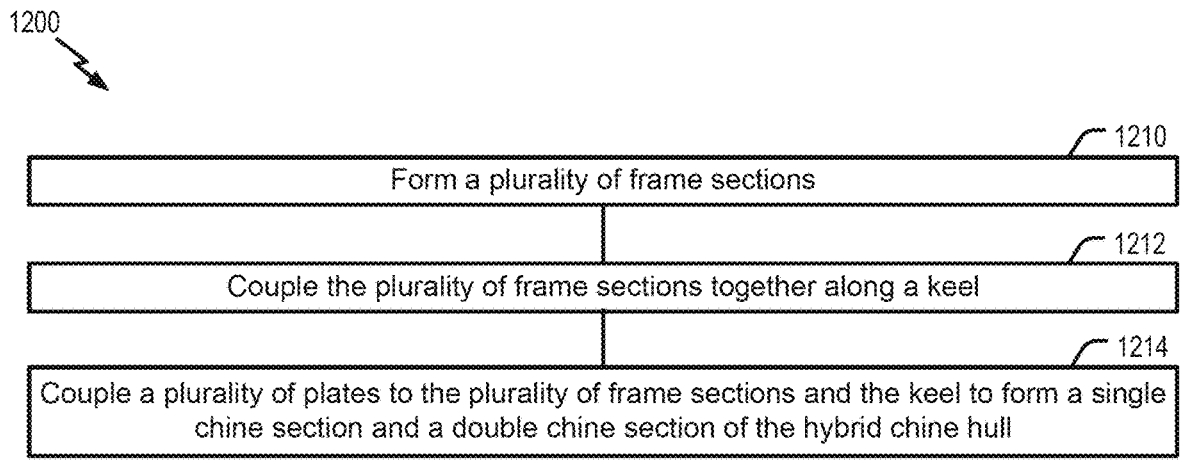
FIG. 12 is a flowchart illustrating an example of a method of manufacturing a hybrid chine hull.

FIG. 12 illustrates a method 1200 of manufacturing a hybrid chine hull. The method 1200 may be performed at dry dock by humans, machines, or a combination thereof. In some implementations, method 1200 is performed by one or more automated machines, which are controlled by one or more controllers.

Method 1200 includes forming a plurality of frame sections, at 1210. The frame sections may include or correspond to components of hull 112, such as components of keel 122, single chine section 124, double chine section 126, or a combination thereof. In a particular implementation, the frame sections include or correspond to hull cross-section pieces.

Method 1200 also includes coupling the plurality of frame sections together along a keel, at 1212. For example, the keel may include or correspond to keel 122. To illustrate, the keel may be laid down in a dry dock and the frame sections may be welded to the keel 112.

Method 1200 further includes coupling a plurality of plates to the plurality of frame sections and the keel to form a single chine section and a double chine section of the hybrid chine hull, at 1214. For example, the single chine section may include or correspond to single chine section 124, and the double chine section may include or correspond to double chine section 126. To illustrate, the plates and shapes of the frame sections may be configured such that when welded together, the plates and shape form or define a hull that has multiple different cross-section shapes. The multiple different cross-section shapes includes one cross-section including or corresponding to a single chine section and another cross-section including or corresponding to a double chine section.

Thus, method 1200 describes operation of forming a hybrid chine hull. Therefore, a marine vessel, such as marine vessel 102, 302 or another vessel including one of the hybrid chine hulls described herein, can be manufactured. Accordingly, a marine vessel, such as marine vessel 102, 302 or another vessel including one of the hybrid chine hulls described herein, has increased performance and efficiency as described herein.

Figure 13:
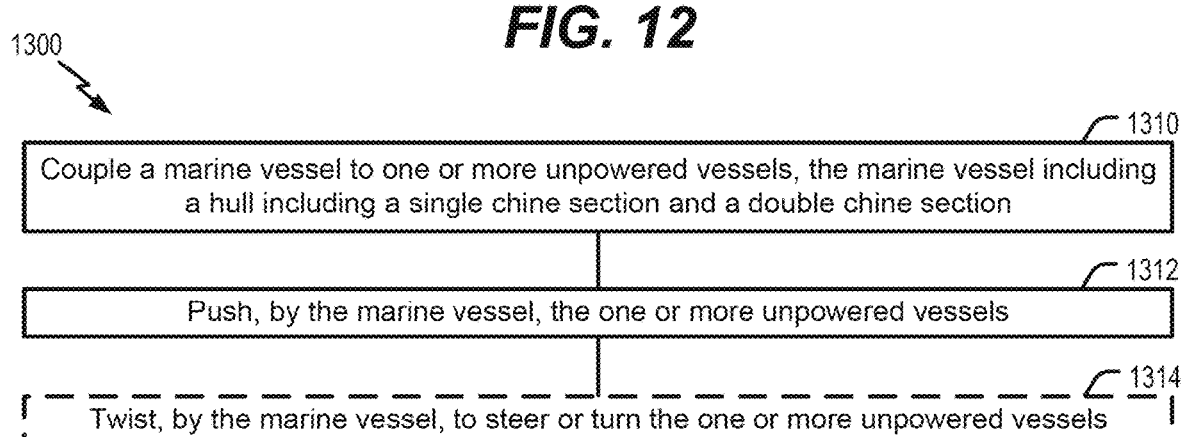
FIG. 13 is a flowchart illustrating an example of a method of operating a marine vessel including a hybrid chine hull.

FIG. 13 illustrates a method 1300 of operating a hybrid chine hull vessel. The method 1300 may be performed at or by marine vessel 102, 302 or another vessel including a hybrid chine hull described herein.

Method 1300 includes coupling a marine vessel to one or more unpowered vessels, the marine vessel including a hull including a single chine section and a double chine section, at 1310. For example, the single chine section may include or correspond to single chine section 124, and the double chine section may include or correspond to double chine section 126. The one or more unpowered vessels may include or correspond to one or more barges. In some implementations, the one or more barges are aligned lengthwise. Additionally, or alternatively, a particular barge of the one or more barges has an under keel clearance of 1-10 feet.

Method 1300 further includes pushing, by the marine vessel, the one or more unpowered vessels, at 1312. For example, the marine vessel is positioned behind the barges and operates the propulsion system 114 in a forward direction to push the barges. The marine vessel may push the one or more barges at different speeds, such as speeds of 3 knots to 15 knots.

Method 1300 optionally includes twisting, by the marine vessel, to steer or turn the one or more unpowered vessels, at 1314. For example, the control system 116 may send control signals to propulsion rudders 162 and flanking rudders 164 to orient the rudders 162, 164 such that torque is applied to marine vessel 102. The torque causes marine vessel 102 and the one or more barges will to twist, thus enabling marine vessel 102 to steer and turn the one or more barges. Thus, method 1300 describes operation of a hybrid chine hull vessel, and the hybrid chine hull vessel may enable increased performance, increased efficiency, and improved safety.

Figure 14:
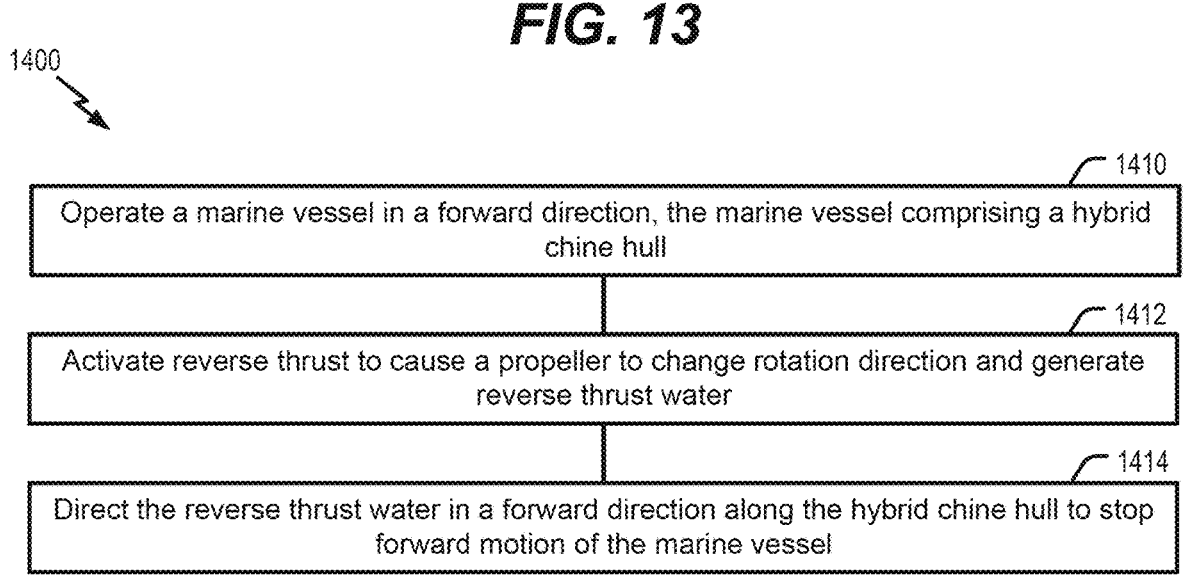
FIG. 14 is a flowchart illustrating another example of a method of operating a marine vessel including a hybrid chine hull.

FIG. 14 illustrates another method 1400 of operating a hybrid chine hull vessel. The method 1400 may be performed at or by marine vessel 102, 302 or another vessel including a hybrid chine hull described herein.

Method 1400 includes operating a marine vessel in a forward direction, the marine vessel comprising a hybrid chine hull, at 1410. For example, the hybrid chine hull may include or correspond to hull 112, 202, 204, 206, 304, 904, or 1504. To illustrate, the marine vessel is moving in a forward direction at full ahead.

Method 1400 also includes activating reverse thrust to cause a propeller to change rotation direction and generate reverse thrust water, at 1412. To illustrate, the marine vessel receives an input of full reverse and control system 116 controls/causes the propulsion system 114 to operate the propellers 134 in the reverse direction (opposite rotation for forward motion). Rotation by the propellers 134 in the opposite or reverse direction causes the propellers 134 to push water, reverse thrust water, from the stern 224 to the bow 222.

Method 1400 further includes directing the reverse thrust water in a forward direction along the hybrid chine hull to stop forward motion of the marine vessel, at 1414. For example, as the propellers 134 force more water forward, the shape of the hybrid chine hull causes the water to flow along the hybrid chine hull. Thus, method 1400 describes operation of a vessel including a hybrid chine hull, and the vessel may be more efficient at stopping and reversing directions.

It is noted that one or more operations described with reference to one of the methods of FIGS. 12-14 may be combined with one or more operations of another of FIGS. 12-14. For example, one or more operations of method 1200 may be combined with one or more operations of method 1300. Additionally, or alternatively, one or more operations described above with reference to FIG. 1 may be combined with one or more operations of FIG. 12, FIG. 13, FIG. 14, or a combination of FIGS. 12-14.

EXPERIMENTAL RESULTS

FIGS. 15-18 are directed experimental results of computational fluid dynamic (CFD) testing of a computer model of a hybrid chine hull design. Referring to FIG. 15, FIG. 15 illustrates an example of a marine vessel 1502 including a hybrid chine hull 1504 on which the CFD analysis was performed. FIG. 16 illustrates parameters and conditions used for performing the CFD analysis on the model. In the CFD analysis, a single chine hull vessel, a hybrid chine hull vessel (i.e., 1502), and a double chine hull vessel were tested for pushing a two barge configuration lined up lengthwise (e.g., bow to stern). FIG. 17 illustrates a table comparing results of the single chine, hybrid chine, and double chine hulls with respect to drag. As illustrated in table 1702, drag reduction values are provided in terms of using single chine drag results as a baseline or benchmark amount of drag. Table 1702 illustrate drag reduction for the hybrid chine and double chine hulls for various speeds of 6, 8, and 10 knots and at under keel clearances of 1 foot and 5 feet. Table 1702 also illustrates weights of the vessels in pounds.

Table 1702 depicts that hybrid chine hull had the highest drag reduction score (i.e., most favorable or highest reduction in drag as compared to single chine drag) for any configuration of speed and under keel clearance. Additionally, the hybrid chine hull had more configurations with a reduction drag, over the single chine hull, as compared to the double chine hull.

FIG. 18 illustrates a table 1802 comparing results of the CFD analysis of the single chine, hybrid chine, and double chine hulls with respect to wake. As illustrated in table 1802, nominal wake values for propeller inflow wake are provided for various speeds of 6, 8, and 10 knots and at under keel clearances of 1 foot and 5 feet. Table 1802 illustrates that hybrid chine hull had the highest wake score (i.e., most favorable or lowest wake) out of all of the hulls configurations. Additionally, hybrid chine hull had the highest wake score for each of the under keel clearance conditions tested, i.e., 1 foot and 5 feet. Thus, marine vessel 1502 can be operated at conditions that provide a higher degree of efficiency and with producing a lower wake.

The above specification and examples provide a complete description of the structure and use of illustrative examples. Although certain aspects have been described above with a certain degree of particularity, or with reference to one or more individual examples, those skilled in the art could make numerous alterations to aspects of the present disclosure without departing from the scope of the present disclosure. As such, the various illustrative examples of the methods and systems are not intended to be limited to the particular forms disclosed. Rather, they include all modifications and alternatives falling within the scope of the claims, and implementations other than the ones shown may include some or all of the features of the depicted examples. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one example or may relate to several examples. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A hybrid chine boat hull comprising:
   a keel;
   a single chine section; and
   a double chine section distinct from the single chine section with respect to a longitudinal direction of the keel and positioned aft of the single chine section,
   wherein the single chine section and the double chine section correspond to cross-section portions of the hybrid chine boat hull, wherein the single chine section includes a single chine on each side of the keel, and wherein the double chine section includes an upper chine and a lower chine on each side of the keel, wherein a first single chine of the single chine section transitions into a first upper chine and a first lower chine of the double chine section on one side of the keel;

wherein the double chine section includes a substantially uniform intermediate angled portion with one hard chine;

wherein the keel is a substantially flat plate keel, and wherein the substantially flat plate keel runs a span of the single chine section and the double chine section.

2. The hybrid chine boat hull of claim 1, further comprising a hull bottom, wherein the hull bottom is substantially flat with respect to a transverse direction of the substantially flat plate keel.

3. The hybrid chine boat hull of claim 1, further comprising vertical sidewalls, a hull bottom and intermediate angled portions, the intermediate angled portions including the substantially uniform intermediate angled portion, wherein a particular intermediate angled portion of the intermediate angled portions is positioned between a particular vertical sidewall of the vertical sidewalls and the hull bottom, wherein a particular upper chine of the double chine section joins the particular vertical sidewall and the particular intermediate angled portion, and wherein a particular lower chine of the double chine section joins the hull bottom and the particular intermediate angled portion, wherein the particular intermediate angle portion is angled relative to the vertical sidewalls and to the hull bottom.

4. The hybrid chine boat hull of claim 1, wherein the first single chine transitions into the first upper chine and the first lower chine at a mid-hull portion of the hybrid chine boat hull, and wherein the first single chine is positioned between the first upper chine and the first lower chine with respect to hull depth.

5. The hybrid chine boat hull of claim 1, wherein the first single chine transitions into the first upper chine and the first lower chine at an aft portion of the hybrid chine boat hull.

6. The hybrid chine boat hull of claim 1, further comprising a second single chine section, the second single chine section distinct from the single chine section and the double chine section with respect to the longitudinal direction of the keel, wherein the second single chine section is positioned aft of the double chine section.

7. The hybrid chine boat hull of claim 1, wherein the single chine section includes a single hard chine, and wherein the double chine section includes two hard chines.

8. The hybrid chine boat hull of claim 1, wherein the single chine section includes a single soft chine.

9. The hybrid chine boat hull of claim 1, the keel further defining a tunnel cavity.

10. The hybrid chine boat hull of claim 1, further comprising one or more storage compartments defined by the hybrid chine boat hull, wherein the single chine section includes a single hard chine.

11. The hybrid chine boat hull of claim 1, further comprising a generally rectangular-shaped upper hull portion.

12. The hybrid chine boat hull of claim 1, further comprising a frame, the frame including a plurality of frame members coupled to the keel.

13. The hybrid chine boat hull of claim 1, further comprising a bow and a stern, wherein the single chine section represents a fore portion of the hull which extends from proximate the bow to a mid-hull portion of the hybrid chine boat hull, and wherein the double chine section represent an aft portion of the hull extending from the mid-hull portion to proximate the stern.

14. The hybrid chine boat hull of claim 1 wherein the chines of the single and double chine sections are substantially outboard of the keel.

15. The hybrid chine boat hull of claim 1, wherein the chines of the single and double chine sections are disposed substantially above a horizontal plane of a bottom of the keel.

16. A marine vessel comprising:
a hybrid chine hull, the hybrid chine hull comprising:
a keel;
a single chine section; and
a double chine section distinct from the single chine section with respect to a longitudinal direction of the keel,
wherein the single chine section and the double chine section correspond to cross-section portions of the hybrid chine boat hull,
wherein the single chine section includes a single chine on each side of the keel, and wherein the double chine section includes an upper chine and a lower chine on each side of the keel,
wherein a first single chine of the single chine section transitions into a first upper chine and a first lower chine of the double chine section on one side of the keel;
wherein the double chine section includes a substantially uniform intermediate angled portion with one hard chine;
wherein the keel is a substantially flat plate keel, and wherein the substantially flat plate keel runs a span of the single chine section and the double chine section;
a propulsion system; and
a control system.

17. The marine vessel of claim 16, the propulsion system comprising an engine and a propeller, and the hybrid chine hull further comprising sidewalls, wherein the chines of the single and double chine sections are positioned proximate to sidewalls of the hull with respect to a transverse direction of the keel.

18. The marine vessel of claim 16, the control system comprising:
a controller; and
one or more rudders.

19. The marine vessel of claim 18, the one or more rudders including at least one propulsion rudder and at least one flanking rudder.

20. The marine vessel of claim 16, wherein a bow of the marine vessel is flat and configured to push one or more barges, and wherein the marine vessel comprises an inland push boat or an offshore supply boat.

* * * * *